United States Patent [19]

Sander et al.

[11] Patent Number: 4,992,829

[45] Date of Patent: Feb. 12, 1991

[54] FLASH LAMP INTENSITY CONTROL FOR ELECTROSTATOGRAPHIC REPRODUCTION MACHINES

[75] Inventors: Charles F. Sander, Webster; Thomas J. Hammond, Penfield; Edward A. Powers, Penfield; Winston J. Powers, Williamson, all of N.Y.

[73] Assignee: Xerox Corporation, Stamford, Conn.

[21] Appl. No.: 344,776

[22] Filed: Apr. 27, 1989

[51] Int. Cl.[5] .................... G03G 15/04; G03B 27/80

[52] U.S. Cl. .................................... 355/208; 355/228; 355/68; 355/69

[58] Field of Search ............... 355/206, 208, 214, 228, 355/229, 68, 69; 315/241 R, 241 P, 151, 158

[56] References Cited

U.S. PATENT DOCUMENTS

| | | | |
|---|---|---|---|
| Re. 32,253 | 9/1986 | Bartulis et al. | 355/14 C |
| 4,021,112 | 5/1977 | Wilson | 355/219 X |
| 4,027,199 | 5/1977 | Johnson | 315/241 R |
| 4,272,188 | 6/1981 | Lehman | 355/68 |
| 4,334,767 | 6/1982 | Lehman | 355/68 |
| 4,737,819 | 4/1988 | Taniguchi | 355/68 X |
| 4,794,422 | 12/1988 | Lehman et al. | 355/228 X |

*Primary Examiner*—Joan H. Pendegrass
*Attorney, Agent, or Firm*—Frederick E. McMullen

[57] ABSTRACT

Flash lamp intensity control in which a small preflash lamp first exposes each document on the platen of an electrostatographic machine, a photosensor generates a signal representative of the intensity of the light reflected from the platen, and a controller increases power to the main flash exposure lamps in response to the signal where the measured intensity is less than the normal exposure intensity of the main flash lamps.

7 Claims, 26 Drawing Sheets

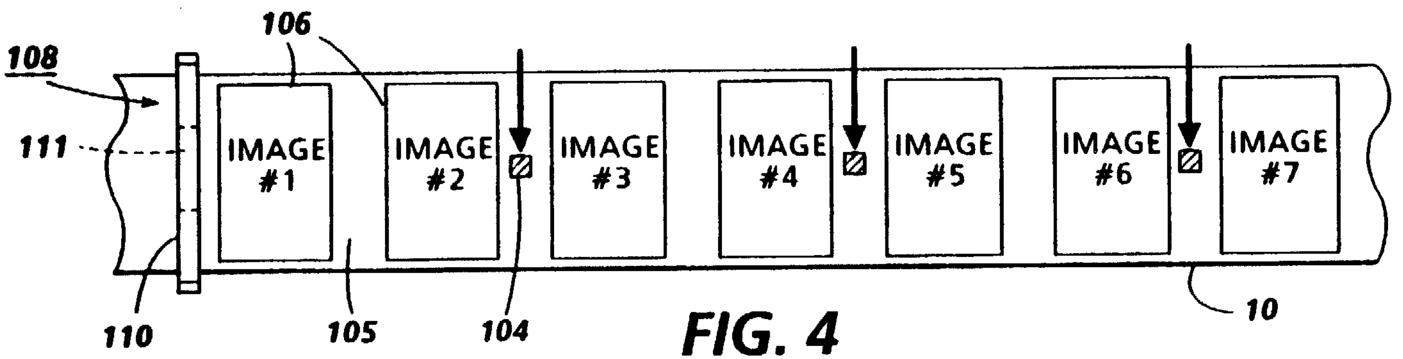

FIG. 4

WITH AN INITIAL CHARGE 2 SHIELD BIAS OF VOLTS, DEAD CYCLE FOR 3 PR BELT REVOLUTIONS. DURING THIS PERIOD, CREATE A PATCH AND TAKE AN ESV READING IN EVERY EVEN NUMBERED ID ZONE (2,4, AND 6). CALCULATE THE AVERAGE ESV READING FOR EACH INDIVIDUAL ZONE. NOTE: DURING THIS MEASUREMENT PERIOD, THE PATCH GENERATOR IS SWITCHED ON IN THE HIGH OUTPUT MODE IN ORDER TO ERASE THE PATCHES PRIOR TO DEVELOPMENT.

↓

CALCULATE THE ESV OFFSET FOR ID ZONE #2 BY SUBSTRACTING THE AVERAGE ESV READING OF ID ZONE #4 FROM THE AVERAGE ESV READING OF ID ZONE #2.

↓

CALCULATE THE ESV OFFSET FOR ID ZONE #6 BY SUBSTRACTING THE AVERAGE ESV READING OF ID ZONE #4 FROM THE AVERAGE ESV READING OF ID ZONE #6.

FIG. 9

FLASH LAMP INTENSITY CONTROL FOR ELECTROSTATOGRAPHIC REPRODUCTION MACHINES

The invention relates to electrostatographic reproduction machines, and more particularly, to a xerographic setup and operating system for such machines.

In some electrostatographic based copiers and printers, it is critical that the xerographic process practiced by the machine operate within the machine design parameters if the copy quality for which the machine is designed is to be achieved and maintained through the machine life. Previous machines have typically employed a converging electrostatic contrast target for setup which can lead to errors and large variations in tone reproduction curves, both within the individual machine and from machine to machine.

Further, xerographic setup in order to provide correct machine operation needs particularly to account for photoreceptor dark decay, exposure lamp aging, sensor offset voltages, exposure levels, etc.

In the prior art, U.S. Pat. No. 4,334,767 to Lehman and U.S. Pat. No. 4,272,188 to Lehman et al disclose an automatic exposure system for a copying machines having flash exposure in which energy to the flash lamps is controlled by quenching in response to document image conditions. Re. 32,253 to Bartulis et al discloses a copier/duplicator with combination touchscreen and keyboard controller.

In contrast, the present invention provides a process for assuring that the intensity at which images are exposed to the photoreceptor in a reproduction machine is sufficient, the machine having at least one main flash lamp for image exposure, chargeable capacitor means for driving the main flash lamp to provide a predetermined image exposure intensity, a power source for charging the capacitor means to a level sufficient to provide the predetermined image exposure intensity, and a relatively small preflash lamp for calibrating image intensities, comprising the steps of: actuating the preflash lamp to expose each image prior to exposure of the image by the main flash lamp; determining the exposure intensity required to expose the image from the light reflected from the image on exposure by the preflash lamp; and where the exposure intensity for the image is greater than the predetermined image exposure intensity provided by the main flash lamp, increasing power to the capacitor means by an amount sufficient to raise the exposure intensity of the main flash lamp to a level greater than the predetermined image exposure intensity whereby to provide the increased exposure intensity required for the image.

DETAILED DESCRIPTION OF THE DRAWINGS

For a better understanding of the present invention, reference may be had to the accompanying drawings in which:

FIG. 4 is a schematic view showing development patches on the photoreceptor belt for use in measuring ESV offset;

FIG. 9 is a flow chart of the ESV offset routine;

Figure 13:
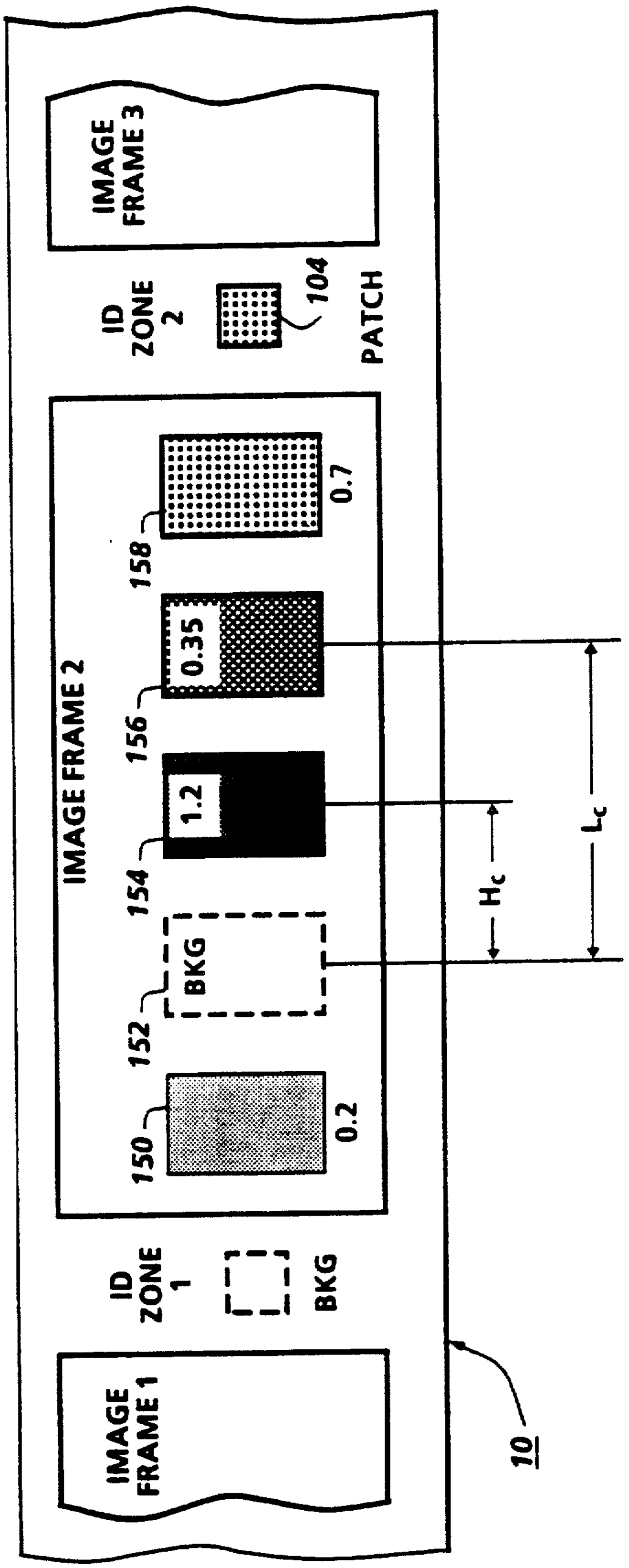
Figure 14:
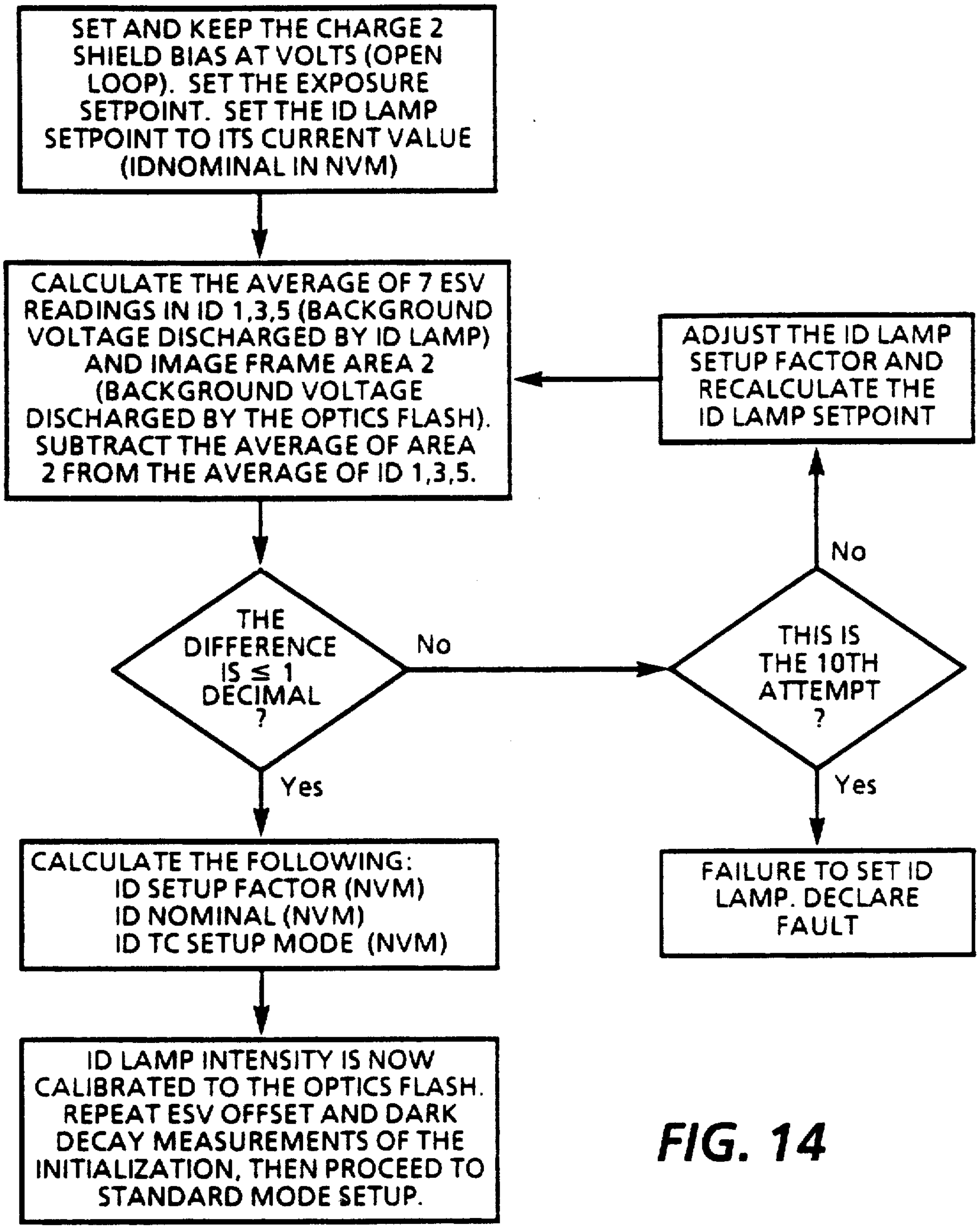
Figure 15:
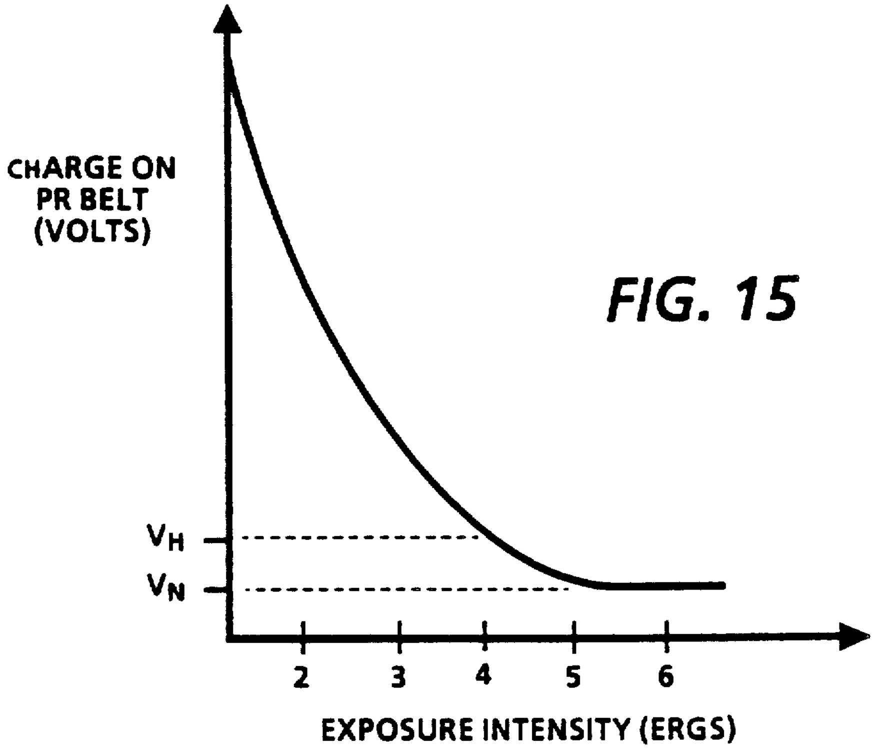
Figure 16:
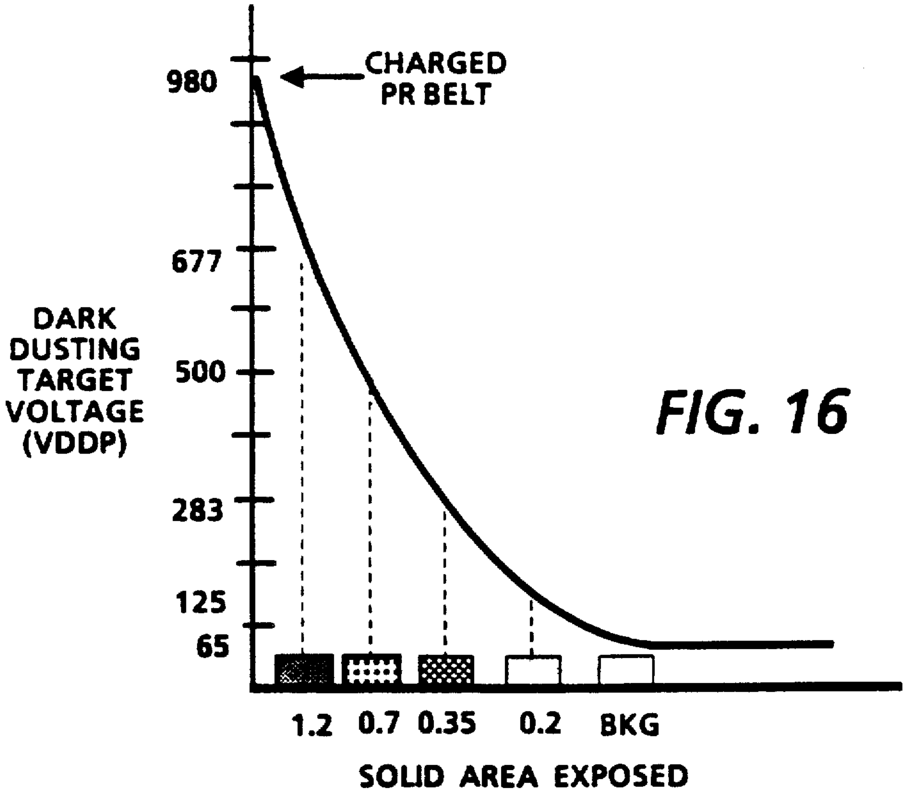
Figure 17:
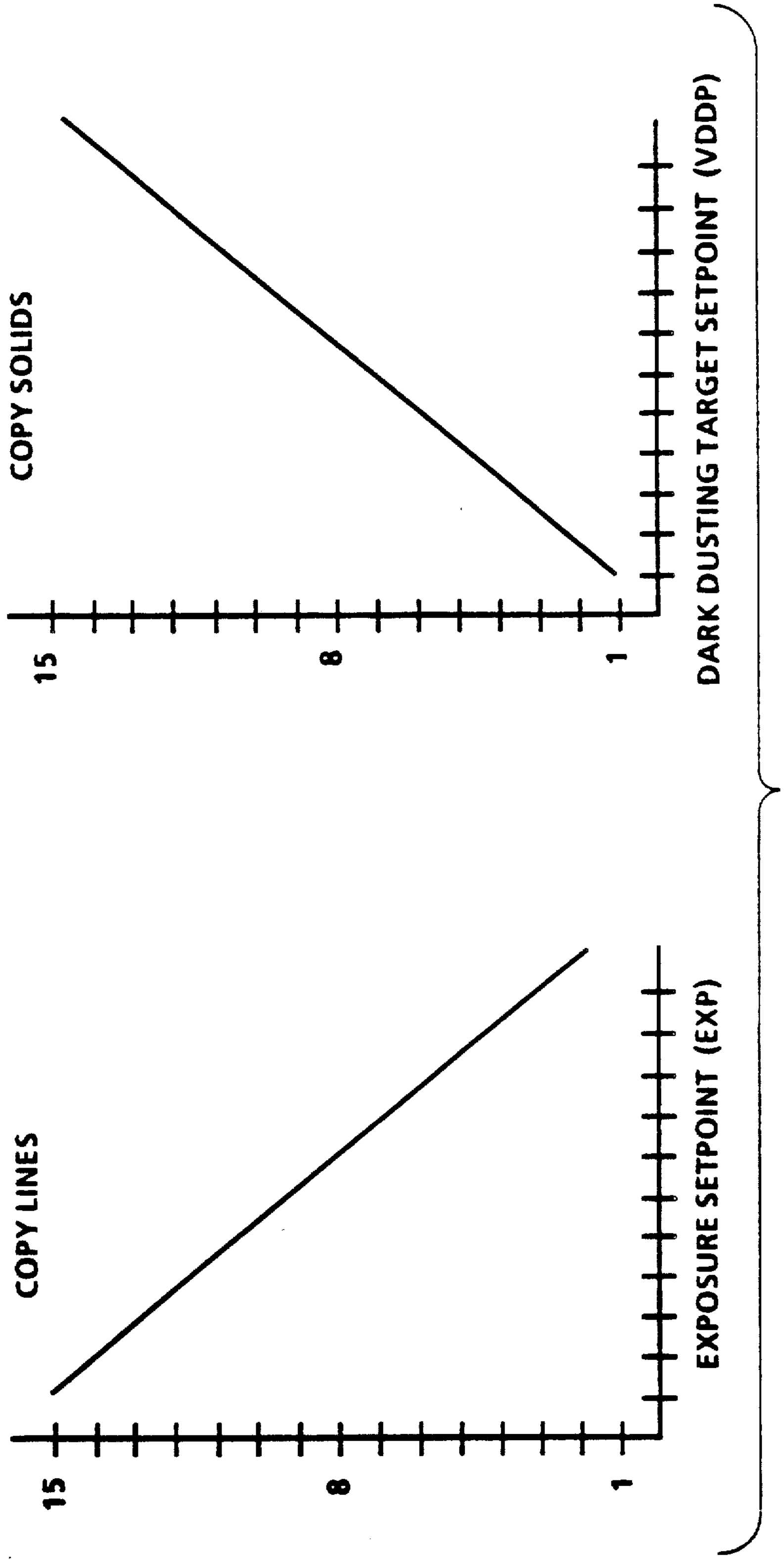
Figure 18:
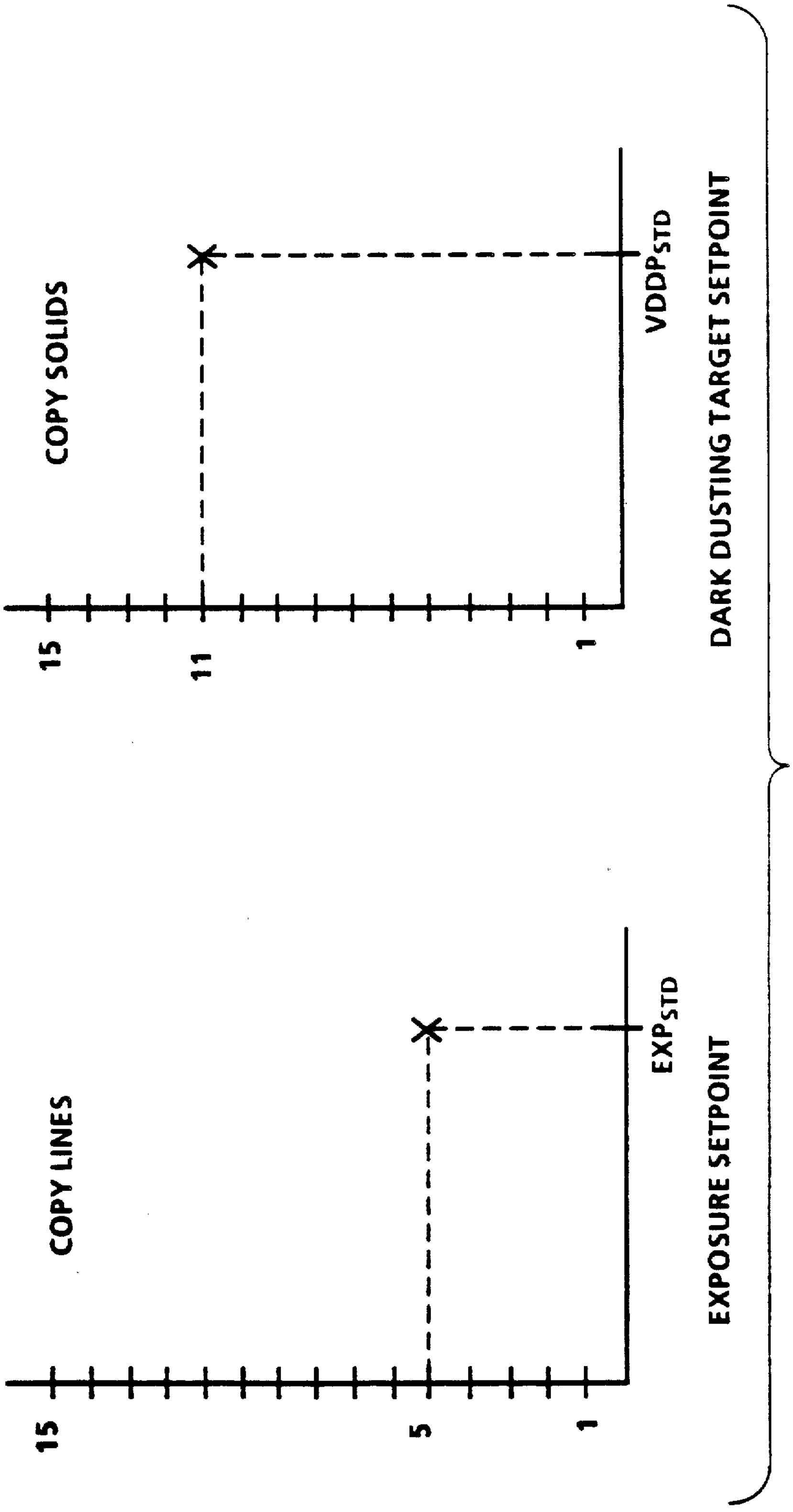
Figure 19:
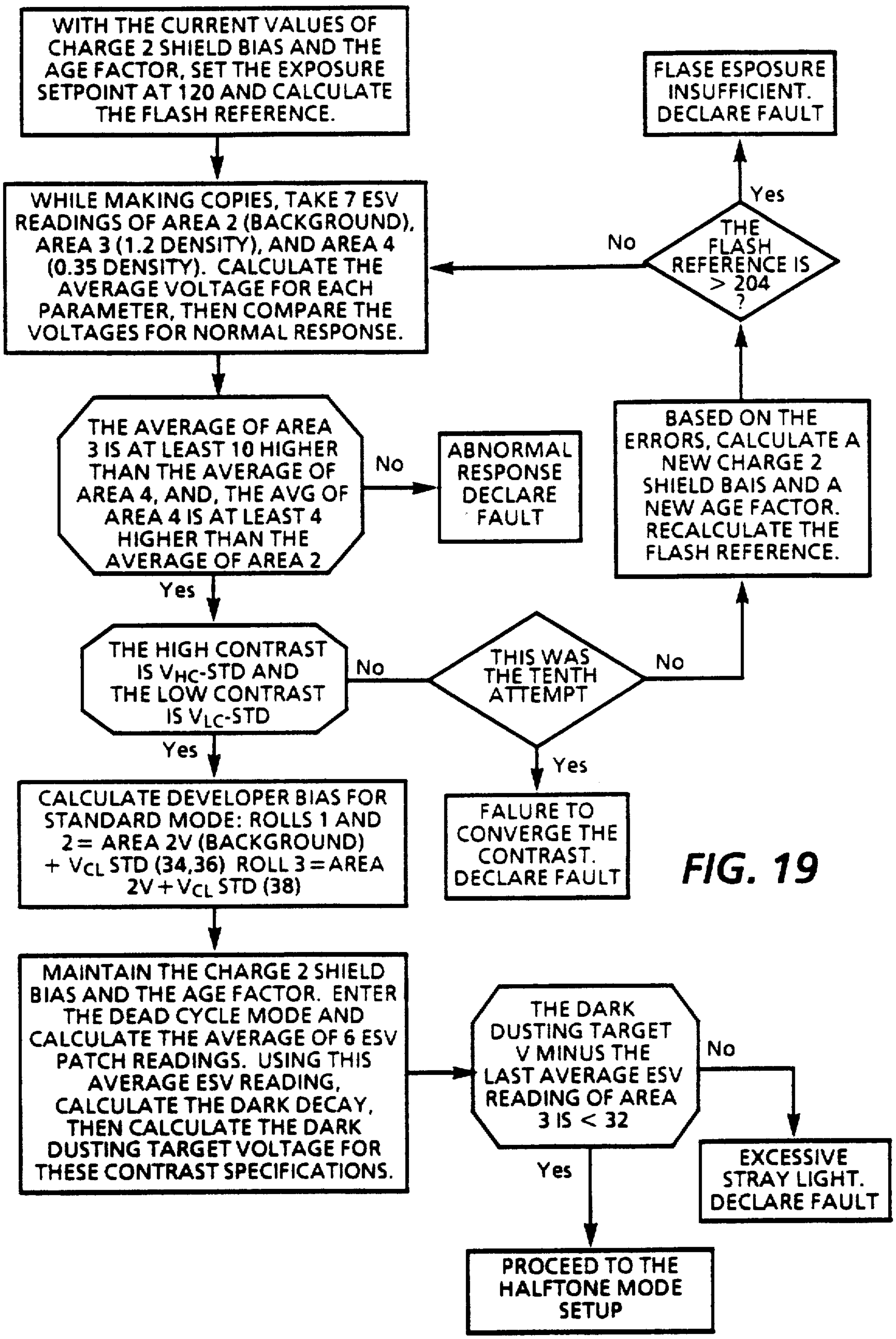
Figure 20:
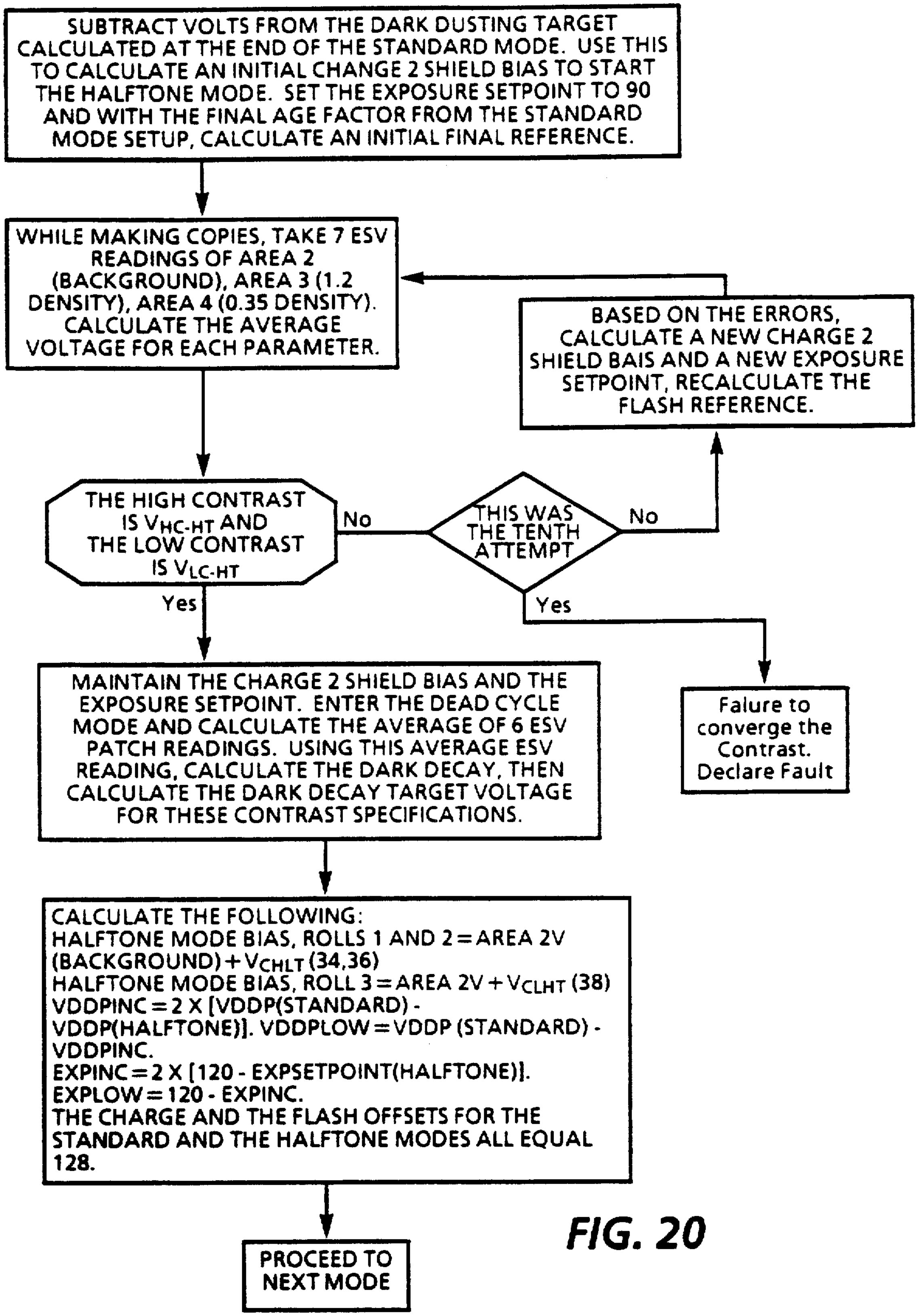
Figure 21:
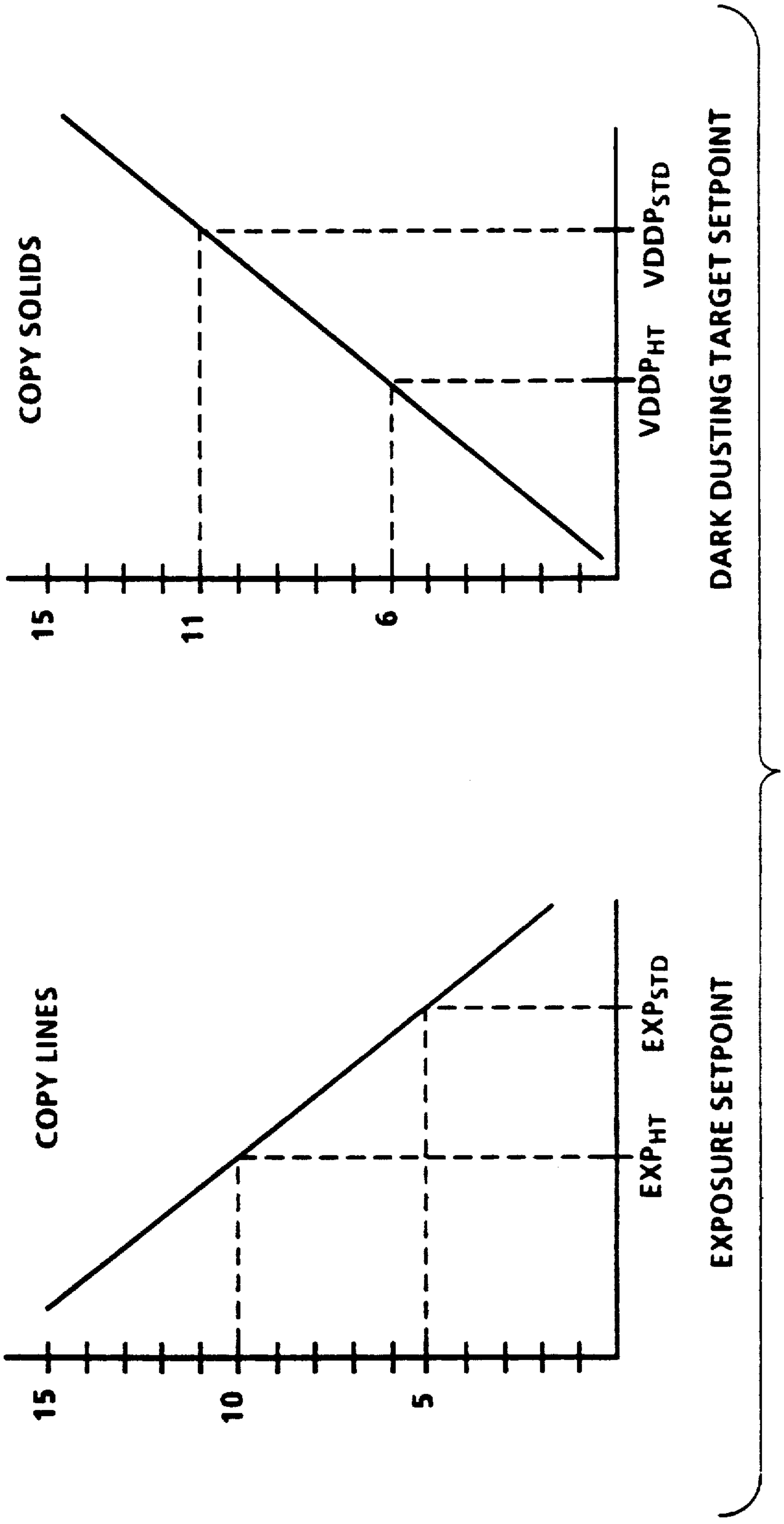
Figure 22:
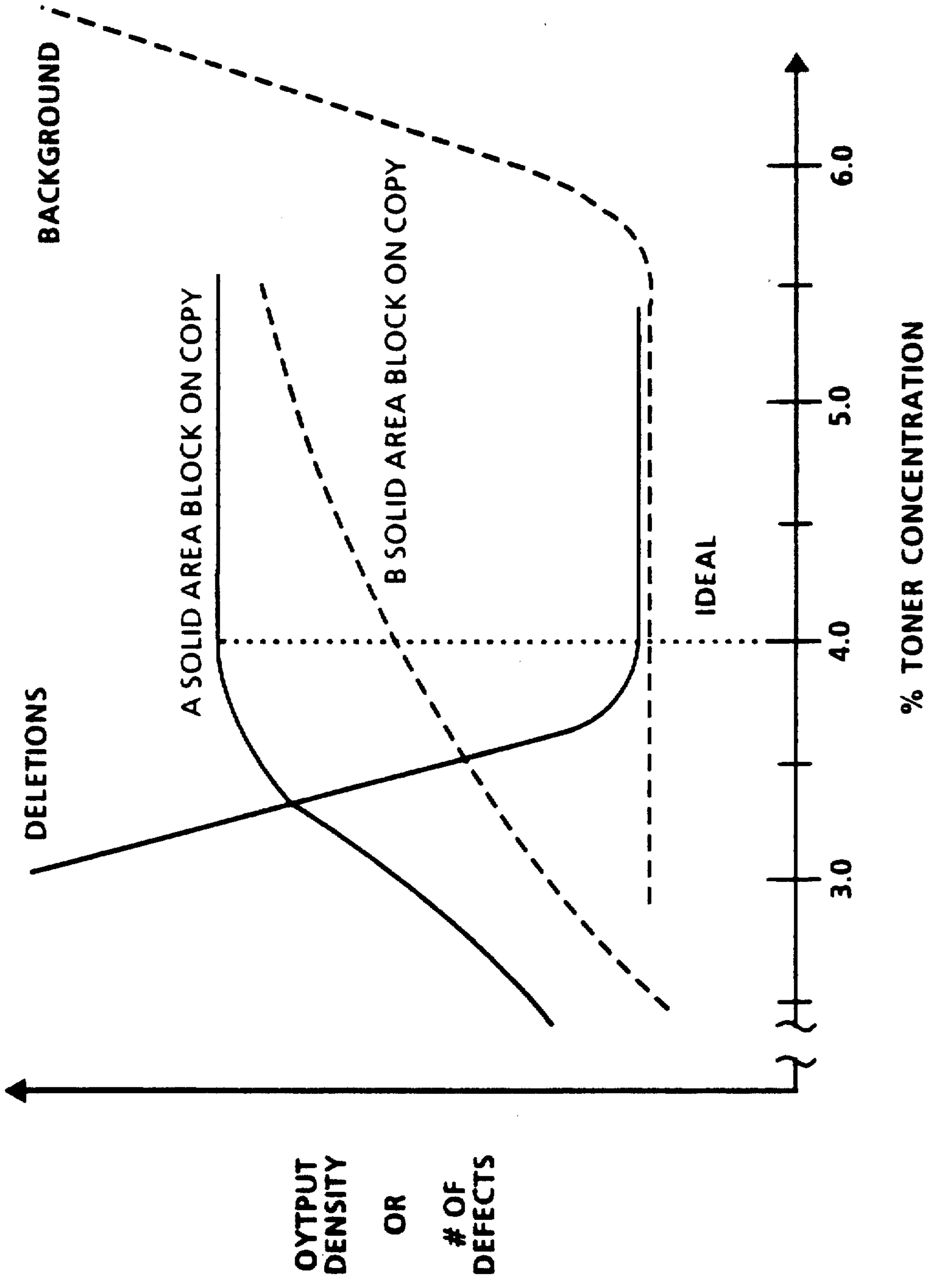
Figure 23:
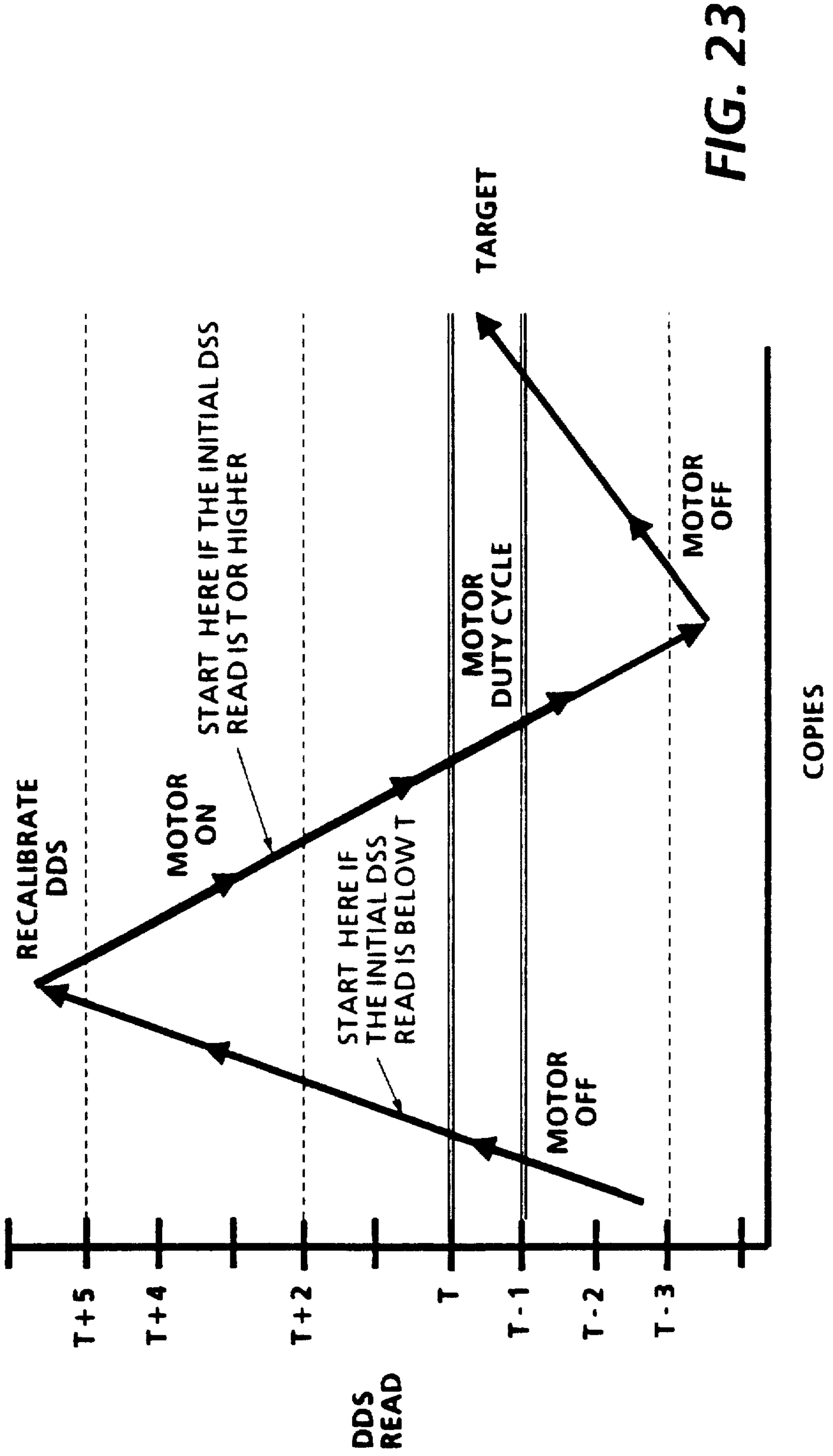
Figure 24:
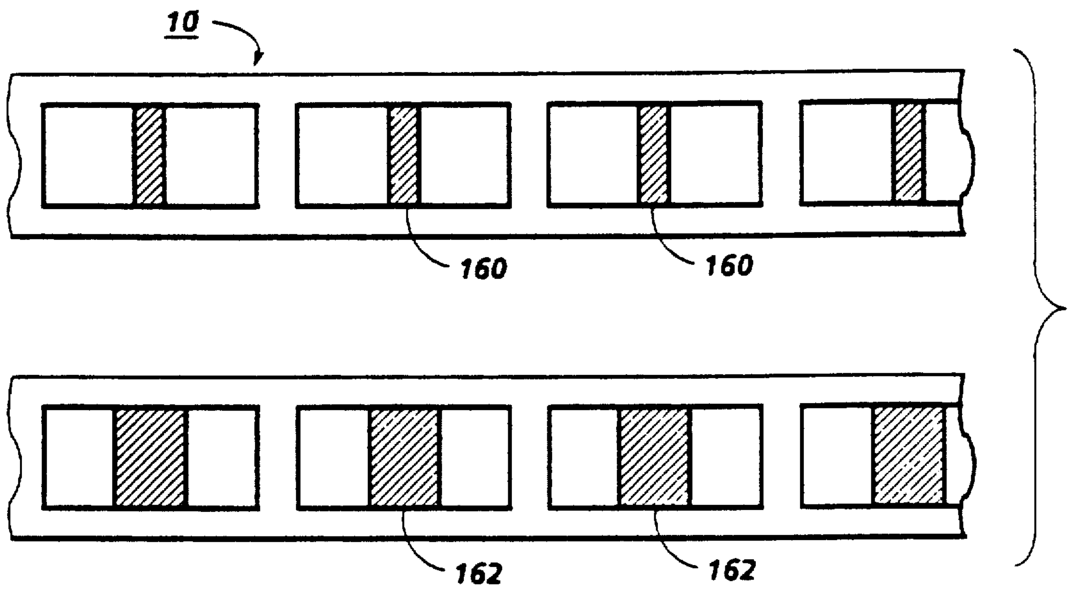
Figure 25:
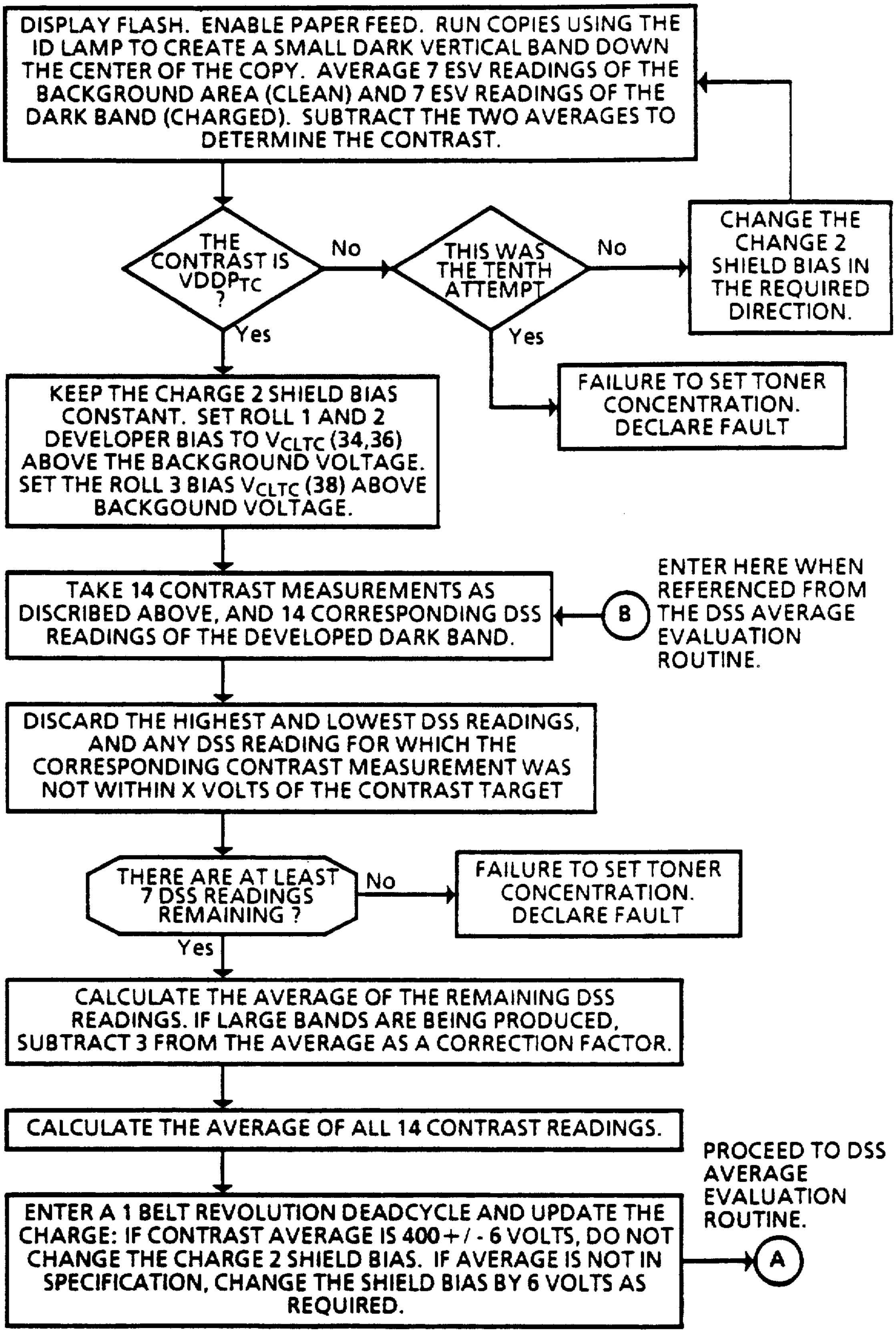
Figure 26:
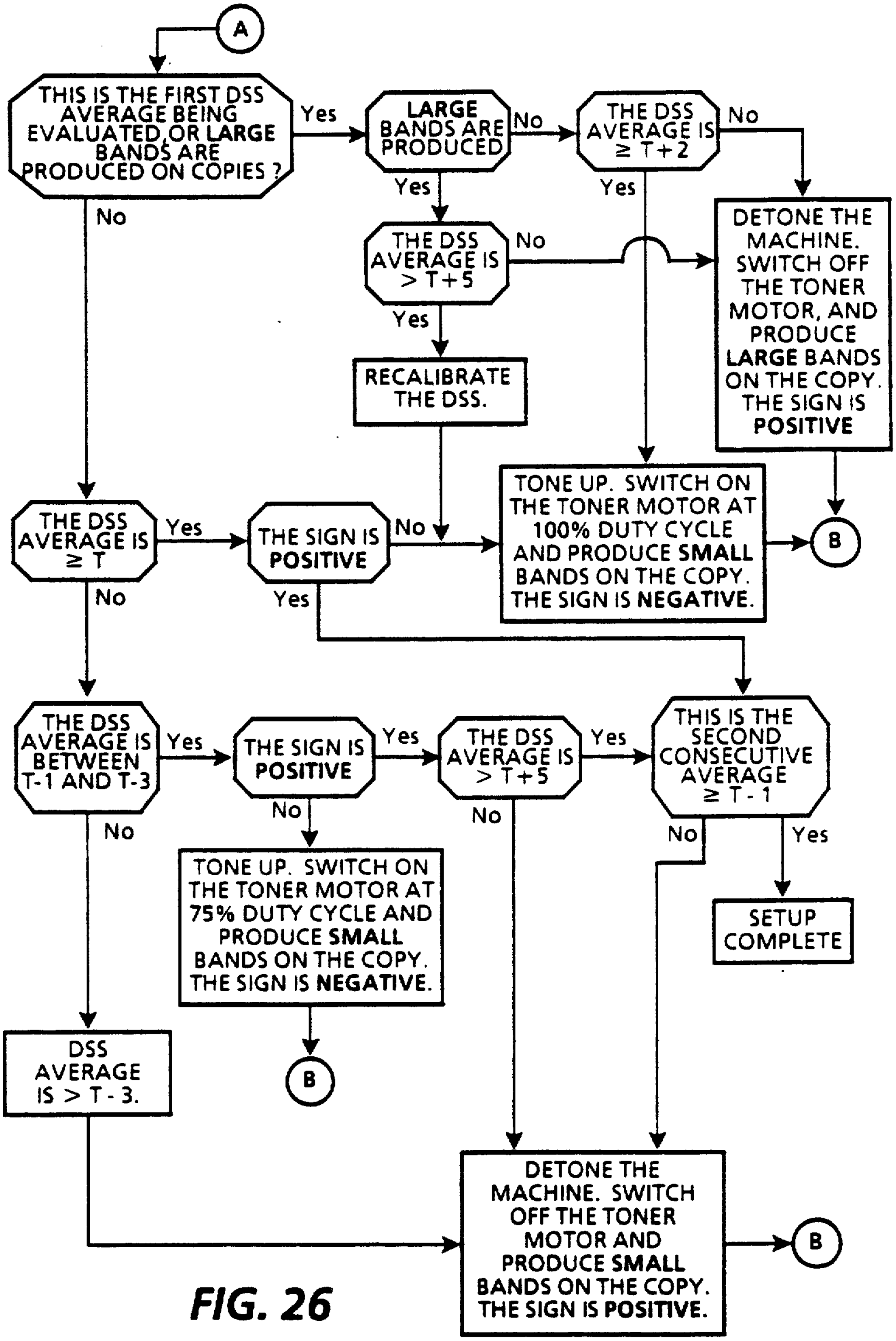
Figure 27:
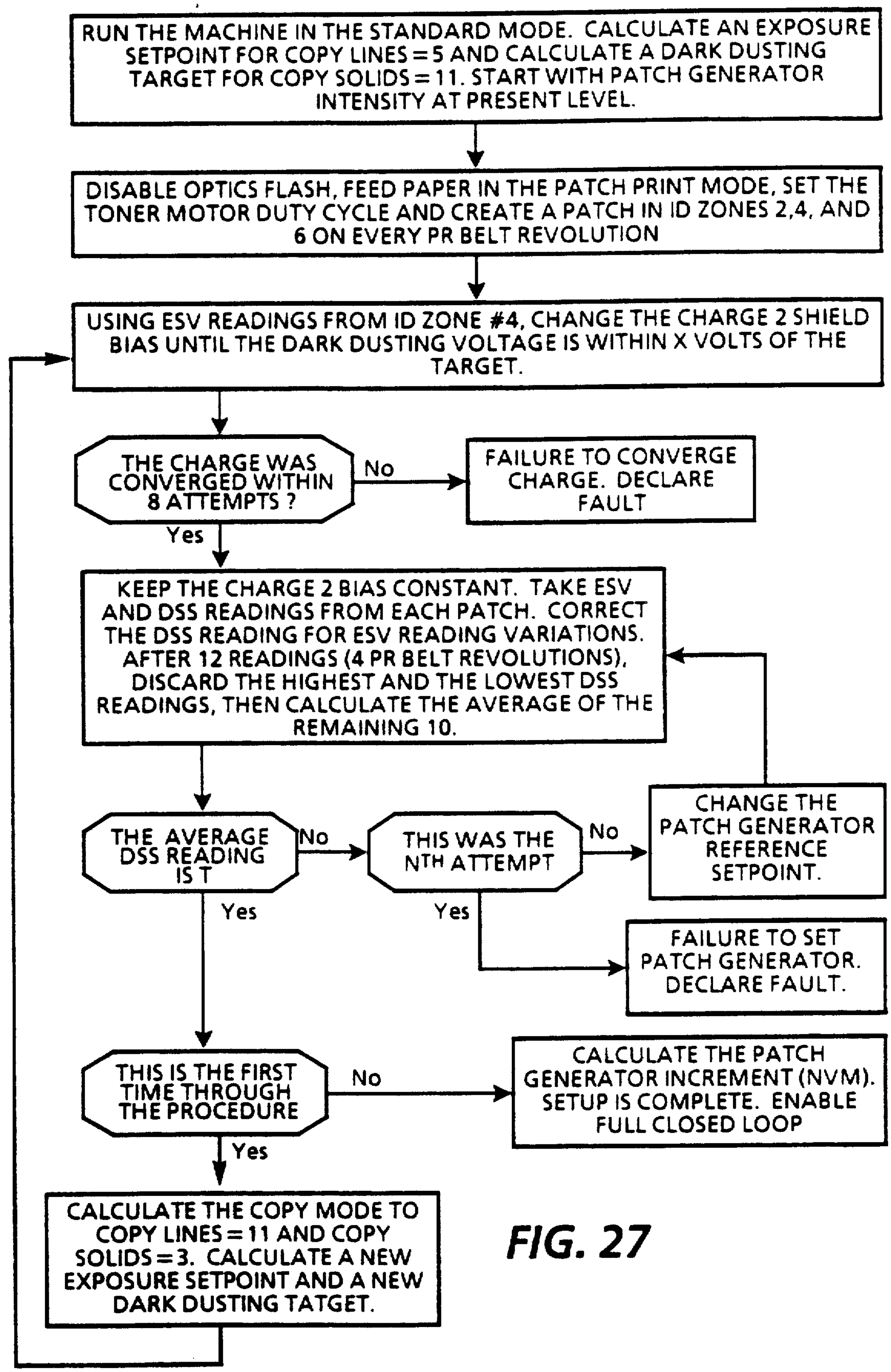

FIG. **11*a*** is a flow chart of the photoreceptor dark decay intercept measurement routine;

FIG. **11*b*** is a flow chart of the coronode shield biasing routine using the photoreceptor dark decay intercept during normal machine operation;

FIG. **11*c*** is a flow chart depicting the charge sharing routine;

FIG. **12*a*** is a flow chart of the preflash setup routine;

FIG. **12*b*** is a flow chart depicting the flash lamp adjusting routine during printing;

FIG. **12*c*** is a flow chart depicting the illumination intensity adjustment for the ID lamp;

FIG. 13 is a schematic view depicting contrast voltage areas on the photoreceptor belt following exposure to a test pattern;

FIG. 14 is a flow chart of the ID lamp setup routine;

FIG. 15 is a graph of the photoreceptor belt discharge curve;

FIG. 16 is a graph depicting photoreceptor belt discharge versus exposure density;

FIG. 17 are graphical representations of typical copy lines and copy solids scales;

FIG. 18 is a graphical representation of copy lines and copy solids scans following completion of the standard mode setup;

FIG. 19 is a flow chart of the standard mode setup operation;

FIG. 20 is a flow chart of the halftone mode setup operation;

FIg. 21 is a graphical representation of copy lines and copy solids scales after halftone mode setup;

FIG. 22 is a graphical representation of toner concentration versus background and defects;

FIG. 23 is a graphical representation of the toner concentration setup sequence;

FIG. 24 is a schematic view showing narrow and wide banded images obtained during the toner concentration setup sequence;

FIG. 25 is a flow chart of the toner concentration setup routine;

FIG. 26 is a flow charge of the densitometer (DSS) average analysis routine;

FIG. 27 is a flow chart of the patch generator setup operation; and

Figure 28:
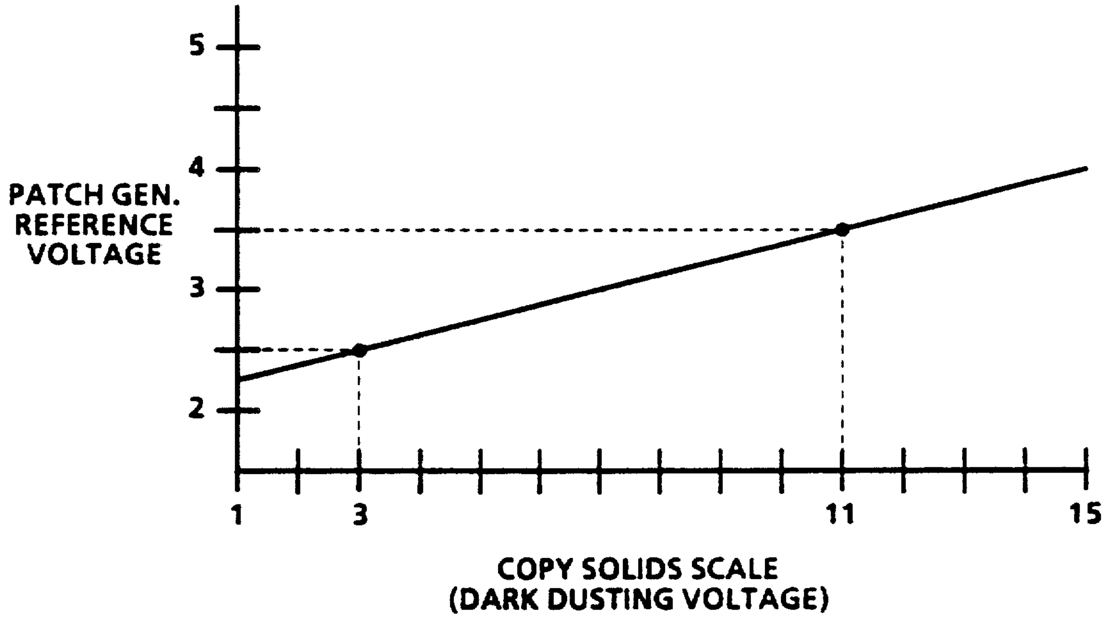

FIG. 28 is a graphical representation of the patch generator reference voltage.

DETAILED DESCRIPTION OF THE PREFERRED EMBODIMENT

Figure 1:
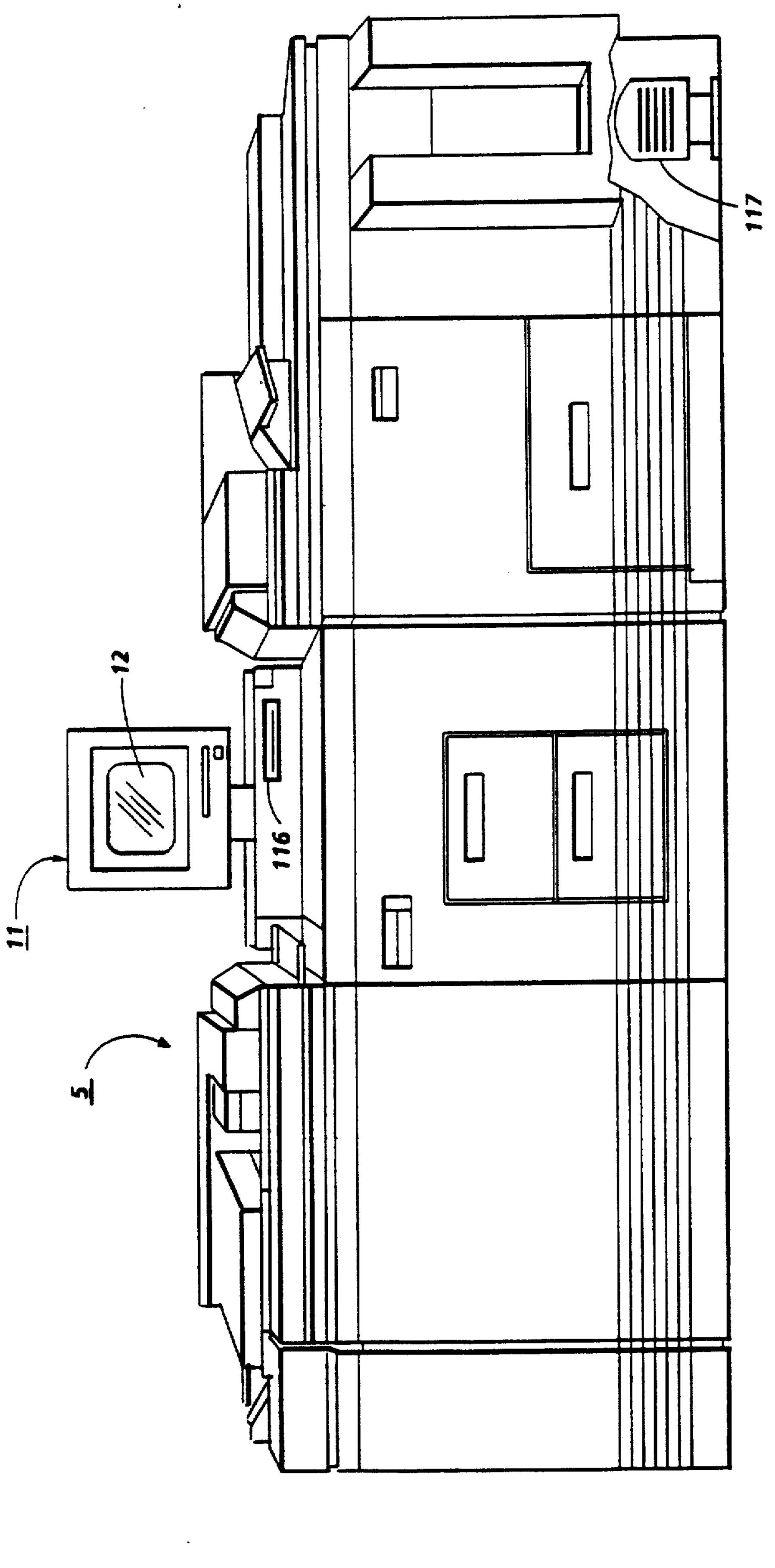
FIG. 1 is an isometric view of an illustrative reproduction machine of the type adapted to use the present invention.
Figure 2:
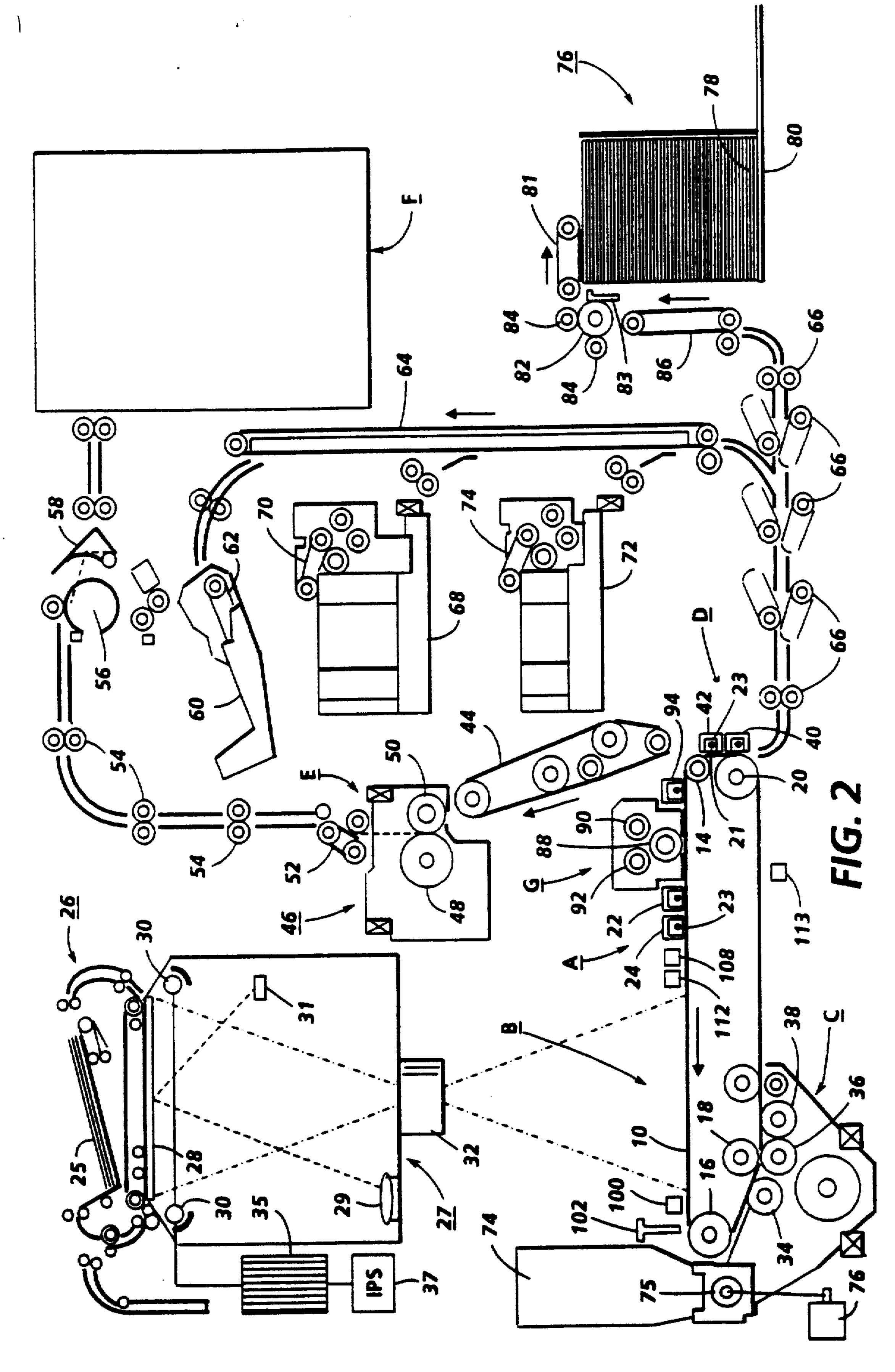
FIG. 2 is a schematic elevational view depicting various operating components and sub-systems of the machine shown in FIG. 1.

For a general understanding of the features of the present invention, reference is made to the drawings. In the drawings, like reference numerals have been used throughout to identify identical elements. Referring to FIGS. 1 and 2, there is shown a multi-copy mode electrophotographic reproduction machine 5 composed of a plurality of programmable components and sub-systems which cooperate to carry out the copying or printing job programmed through a touch dialogue screen 12 of a User Interface (U.I.) 11.

Referring to FIGS. 1 and 2 of the drawings, the electrophotographic printing machine employs a photoconductive belt 10. Belt 10 moves in the direction of the solid line arrow to advance successive portions sequentially through the various processing stations disposed about the path of movement thereof. Belt 10 is entrained about stripping roller 14, tensioning roller 16, idler roller 18, and drive roller 20. Stripping roller 14 and idler roller 18 are mounted rotatably so as to rotate with belt 10. Tensioning roller 16 is resiliently urged against belt 10 to maintain belt 10 under the desired tension. Drive roller 20 is rotated by a motor coupled thereto by suitable means such as a belt drive. As roller 20 rotates, it advances belt 10 in the direction of arrow 12.

Initially, a portion of the photoconductive surface passes through charging station A. At charging station A, two corona generating corotrons such as dicorotrons 22 and 24 charge the photoconductive belt 10 to a relatively high, substantially uniform potential. Dicorotrons 22, 24 (and 40, 42, and 90) each have a coronode 21 and shield 23. Dicorotron 22 places all of the required charge on photoconductive belt 10. Dicorotron 24 normally acts as a leveling device, and fills in any areas missed by dicorotron 22.

Next, the charged portion of the photoconductive surface is advanced through imaging station B. At imaging station B, an optics cavity 27 has a transparent platen 28 on which documents 25 to be copied or printed are positioned. A document handling unit 26 is positioned over platen 28 to sequentially feed documents 25 from a stack of documents onto platen 28. After imaging, the original document is returned from platen 28 to the document stack. Flash lamps 30 in cavity 27 on each side of platen 28 illuminate the document. Light rays reflected from the document are transmitted through suitable optics, shown here as lens 32 in the bottom of optics cavity 27. Lens 32 focuses the light images onto the charged photoconductive belt 20 to selectively dissipate the charge thereon. This records an electrostatic latent image on the photoconductive belt which corresponds to the informational areas contained within the original document. Thereafter, belt 10 advances the electrostatic latent image recorded thereon to development station C.

A small preflash lamp 29 is disposed adjacent the bottom of optics cavity 27 to expose platen 28 and the document 25 resting thereon prior to exposure by flash lamps 30. A suitable photosensor 31 senses the intensity of the light reflected from platen 28 and the document thereon, the control signal output of sensor 31 being used to adjust the charge voltage on the driving capacitors 35 of flash lamps 30 in accordance with the current image conditions as will appear.

Development station C includes a developer housing 33 with three magnetic brush developer rolls, indicated generally by the reference numerals 34, 36 and 38. A paddle wheel picks up developer material and delivers it to the developer rolls. When developer material reaches rolls 34 and 36, it is magnetically split between the rolls with half the developer material being delivered to each roll. Developer roll 38 is a cleanup roll. The latent image attracts toner particles from the carrier granules of the developer material to form a toner powder image on the photoconductive surface of belt 10. Belt 10 then advances the toner powder image to transfer station D. To replenish toner, a toner supply 74 with toner dispenser 75 is provided. Dispenser 75 is driven by toner dispenser motor 76.

At transfer station D, a copy sheet 67 is moved into contact with the toner powder image. First, photoconductive belt 10 is exposed to pretransfer light (not shown) to reduce the attraction between photoconductive belt 10 and the toner powder image. Next, a dicorotron 40 charges the copy sheet to the proper magnitude and polarity so that the copy sheet 67 is tacked to photoconductive belt 10 and the toner powder image attracted from the photoconductive belt to the copy sheet. After transfer, corona generator 42 charges the copy sheet to the opposite polarity to detack the copy sheet from belt 10. Conveyor 44 advances the copy sheet to fusing station E.

Fusing station E includes a fuser assembly, indicated generally by the reference numeral 46 which permanently affixes the transferred toner powder image to the copy sheet. Preferably, fuser assembly 46 includes a heated fuser roller 48 and a pressure roller 50 with the powder image on the copy sheet contacting fuser roller 48. The pressure roller is cammed against the fuser roller to provide the necessary pressure to fix the toner powder image to the copy sheet. The fuser roll is internally heated by a quartz lamp.

After fusing, the copy sheets are fed through a decurler 52. Decurler 52 bends the copy sheet in one direction to put a known curl in the copy sheet and then bends it in the opposite direction to remove that curl.

Forwarding roller 54 the advance the sheet to duplex turn roll 56. Duplex solenoid gate 58 guides the sheet to the finishing station F or to duplex tray 60. At finishing station F, copy sheets are stacked in a compiler tray and attached to one another to form sets. When duplex copies are desired, solenoid gate 58 diverts the sheet into duplex tray 60. The simplex sheets in tray 60 are fed, in seriatim, by bottom feeder 62 from tray 60 back to transfer station D via conveyor 64 and rollers 66 for transfer of the toner powder image to the opposed sides of the copy sheets.

Copy sheets 67 are fed to transfer station d from the secondary tray 68. The secondary tray 68 includes an elevator to raise and lower the tray. When the tray is in the down position, stacks of copy sheets are loaded thereon or unloaded therefrom. In the up position, successive copy sheets may be fed therefrom by sheet feeder 70. Sheet feeder 70 is a friction retard feeder utilizing a feed belt and take-away rolls to advance successive copy sheets to transport 64 which advances the sheets to rolls 66 and then to transfer station D. Copy sheets may also be fed to transfer station D from the auxiliary tray 72 or from a high capacity feeder 76, the later serving as the primary source of copy sheets 67.

Invariably, after the copy sheet is separated from the photoconductive belt 10, some residual particles remain adhering thereto. After transfer, photoconductive belt 10 passes beneath dicorotron 94 which charges the residual toner particles to the proper polarity. Thereafter, light from lamp 39 is impinged on belt through fiber optic light pipe 87 to discharge the photoconductive belt in preparation for the next charging cycle. Residual particles are removed from the photoconductive surface at cleaning station G. Cleaning station G includes an electrically biased cleaner brush 88 and two de-toning rolls 90 and 92, i.e. waste and reclaim de-toning rolls. The reclaim roll is electrically biased negatively relative to the cleaner roll so as to remove toner particles therefrom. The waste roll is electrically biased positively relative to the reclaim roll so as to remove paper debris and wrong sign toner particles. The toner particles on the reclaim roll are scraped off and deposited in a reclaim auger (not shown) where it is transported out of the rear of cleaning station G.

Referring to FIG. 4 also, an Electrostatic Voltmeter (ESV) 100 is provided downstream of imaging station B to read charge levels on photoreceptor belt 10. A patch generator 102 which comprises an LED downstream of ESV 100 serves to expose a box-like area or patch 104 on the charged belt 10 in the interdocument area 105 between the latent electrostatic images 106 formed on belt 10. An Inter Document (ID) lamp 108, which comprises a multi-segment LED light bar 110 spanning the width of belt 10 is provided downstream of dicorotron 24. The center segment 111 of bar 100 is independently regulated to permit segment 111 to be activated separately from bar 100 as will appear. A photocontrast lamp 112 is provided for tonal reproduction of continuous tone originals. An infrared densitometer 113 (referred to also as Density Sampled Sensor or DSS) is provided upstream of transfer station D, densitometer 113 being positioned so as to scan and read the developed density of patch 104 as well as special image patches developed on belt 10 during setup and servicing of machine 5 as will appear.

Figure 3:
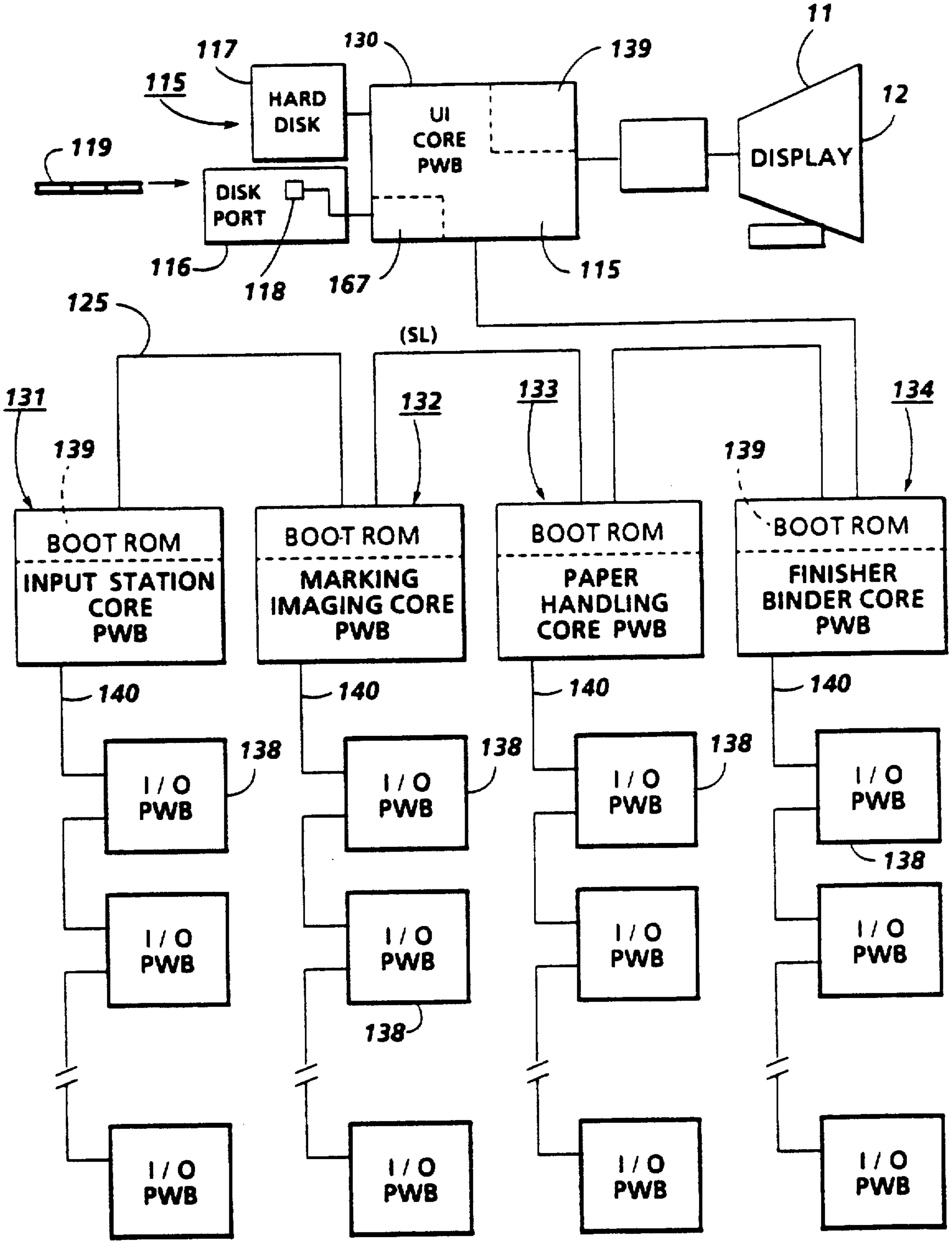
FIG. 3 is a more detailed block diagram depicting the machine Operating System Printed Wiring Boards and shared line connections together with the machine memory and floppy disk port.

Referring to FIG. 3, operation of the various components of machine 5 is regulated by a control system which implements Operating System software stored in memory 115 to operate the various machine components in an integrated fashion to produce copies. The control system includes a plurality of printed wiring boards (PWBs), there being a UI core PWB 130, an Input Station core PWB 131, a Marking Imaging core PWB 132, a Paper Handling core PWB 133, and a Finisher Binder core PWB 134 together with various Input/Output (I/O) PWBs 138. A Shared Line (SL) 125 couples the core PWBs 130, 131, 132, 133, 134 with each other and with memory 115 while local buses 140 serve to couple the I/O PWBs 138 with each other and with their associated core PWB. Programming and operating control over machine 5 is accomplished through touch dialogue screen 12 of UI 11.

Memory 115 includes a main memory in the form of a hard or rigid disk 117 on which the machine Operating System is stored. On machine power up, the Operating System is loaded from memory 115 to UI core PWB 130 and from there to the remaining core PWBs 131, 132, 133, 134 via SL 125. Disk 117 preferably comprises two platter, four head disks with a formatted storage capacity of approximately 20 megabytes. Additional ROM, RAM, and NVM memory types are resident at various locations within machine 5, with each core PWB 130, 131, 132, 134 having a boot ROM 139 for controlling downloading of Operating System software to the PWB, fault detection, etc. A NVM 167 is provided in UI core PWB 130. Boot ROMs 139 also enable transmission of Operating System software and control data to and from PWBs 130, 131, 132, 134 via SL 125 and control data to and from I/O PWBs 138 via local buses 140.

A floppy disk port 116 provides program loading access to memory 115 for the purpose of entering changes to the Operating System, loading specific programs such as diagnostic programs, retrieving stored data such as machine faults, etc. using floppy disks 119. Port 116 includes a suitable read/write head 118 for reading and/or writing from and to a disk 119 in port 116. Floppy disks 119 preferably comprise 3.5 inch, dual sided micro disks with a formatted storaged capacity of approximately 720 kilobytes.

Figure 5:
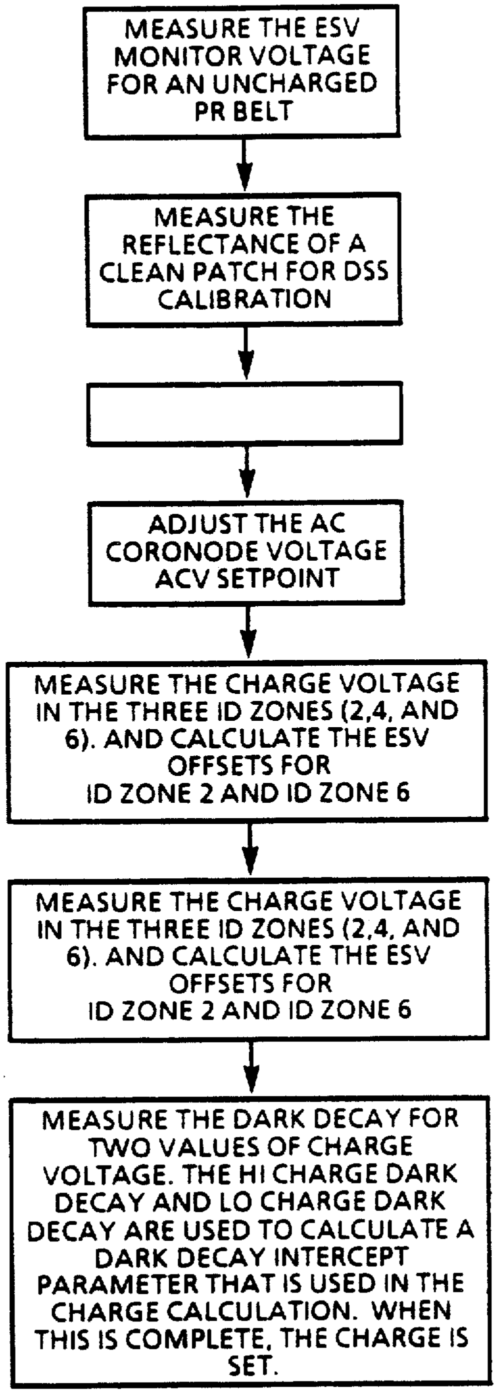
FIG. 5 is a flow chart illustrating the initialization and power up sequence.

Referring to FIGS. 2, 4 and 5, an initialization procedure is performed by the control system whenever machine 10 is initially powered on or whenever a machine setup program is performed. This is evident from the message (Please Wait-Adjusting Copy Quality) that appears on screen 12 when Start is pressed. During the initialization procedure, the voltage on uncharged belt 10 is measured by ESV 100, the reflectance of a clean patch 104 is measured for use in calibrating densitometer 113, the AC voltage setpoint of charge dicorotron 22 is adjusted, the charge voltage of patch 104 in selected ID zones 2, 4, and 6 is measured by ESV 100 and the ESV offsets for zones 1 and 6 calculated, and the photoreceptor dark decay is obtained and the dark decay intercept parameter $D_I$ calculated.

Figure 6:
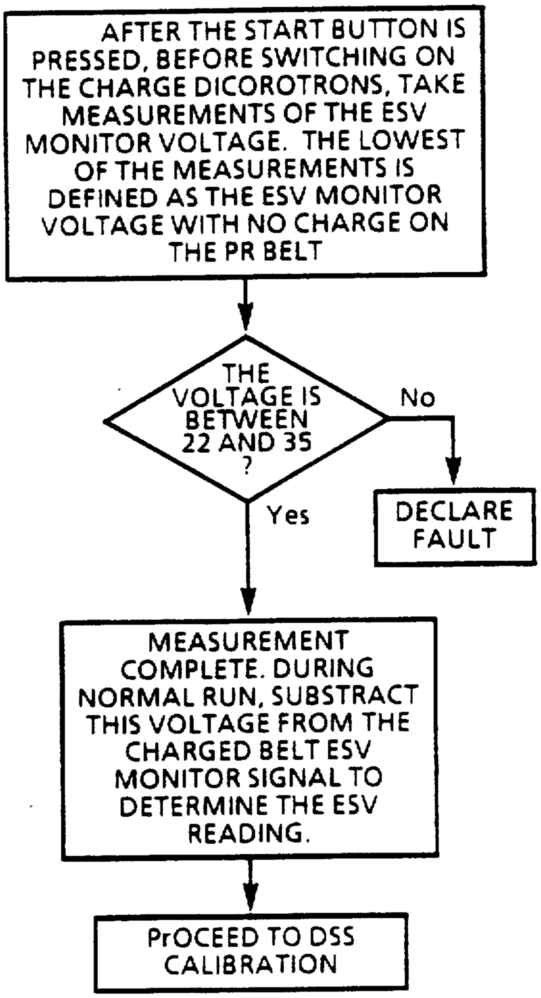
FIG. 6 is a flow chart illustrating the ESV monitor voltage measuring routine.

Referring particularly to FIG. 6, for the first step of the initialization procedure (Measure the ESV Monitor Voltage for an uncharged PR Belt), it is understood that ESV 100 has a built-in nominal offset voltage (referred to as $ESV_{BASE}$) due to internal power supply circuitry. During initialization, the control system takes several readings of the uncharged belt to obtain ESV monitor voltage $ESV_{BASE}$. During normal operation, the control system subtracts the ESV offset voltage $ESV_{BASE}$ from any current ESV voltage reading in order to accurately determine the charge on belt 10.

Figure 7:
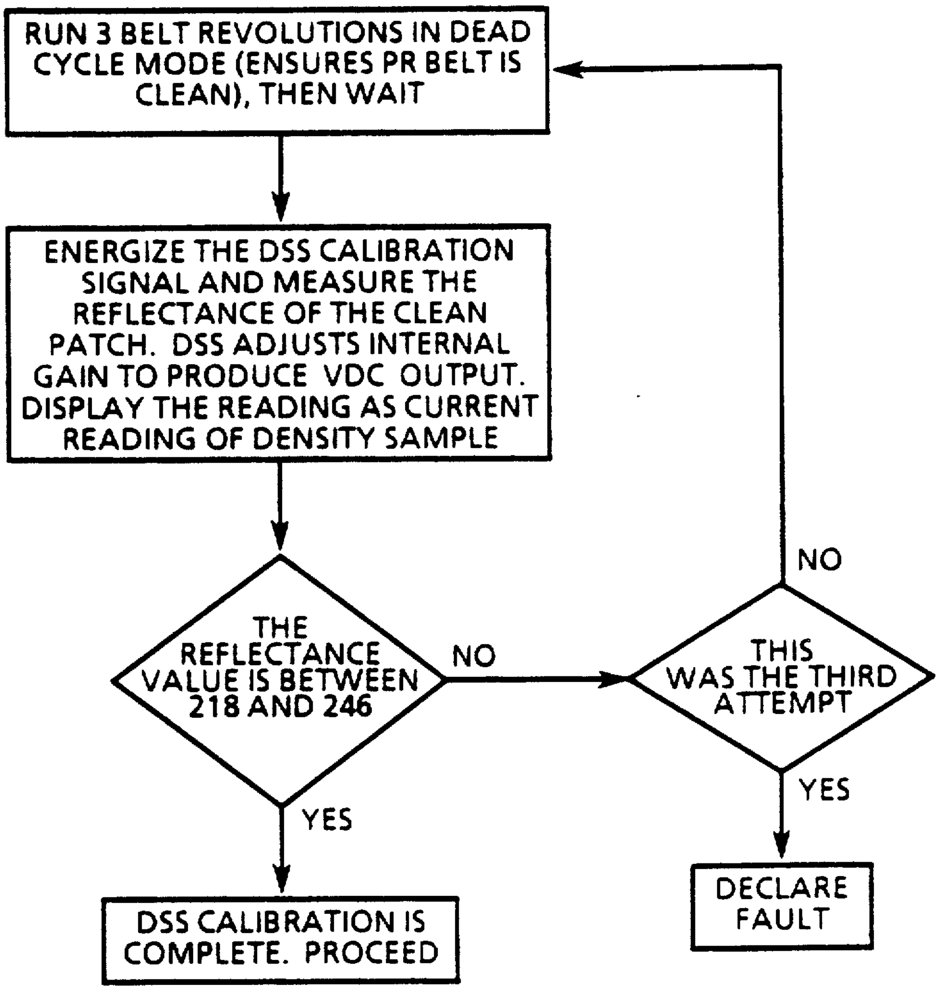
FIG. 7 is a flow chart of the densitometer (DSS) calibration routine.

Referring to FIGS. 4 and 7, to calibrate densitometer 113, a number of revolutions of belt 10 are made and the reflectance of a clean (i.e., undeveloped) patch 104 measured. Using this measurement, the internal gain of densitometer 113 is adjusted in order to produce a preset output voltage VDC to the control system.

Figure 8:
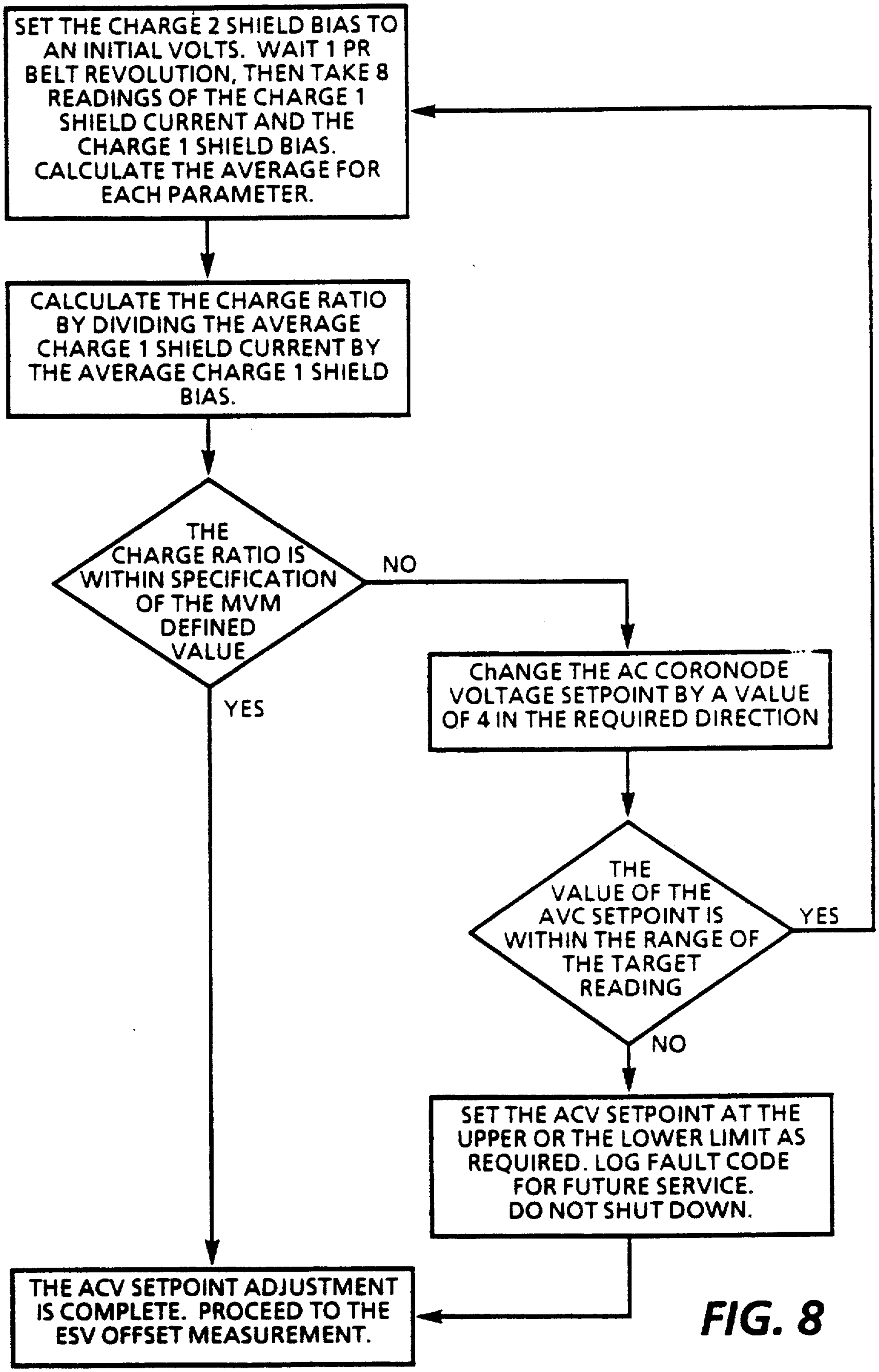
FIG. 8 is a flow chart of the AC coronode voltage adjusting routine.

Referring particularly to FIG. 8, during initialization, the control system adjusts the ac voltage on charge dicorotron 22 until the charge ratio, which is the current on shield 23 divided by the bias on the shield is within a set range of a predetermined value stored in NVM 167. The ac voltage is applied to the coronodes 21 of all dicorotrons 22, 24, 40, 42 and 94.

Referring to FIGS. 4 and 9, ESV 100 measures the charge voltages on a clean patch 104 in selected ID zones (identified here as zones 2, 4, 6) to determine the ESV offsets. Using the reading in one zone, i.e. ID zone 4, as the standard the control system calculates the differences (i.e., offset) between ID zones 2 and 4 and between zones 4 and 6.

Figure 10:
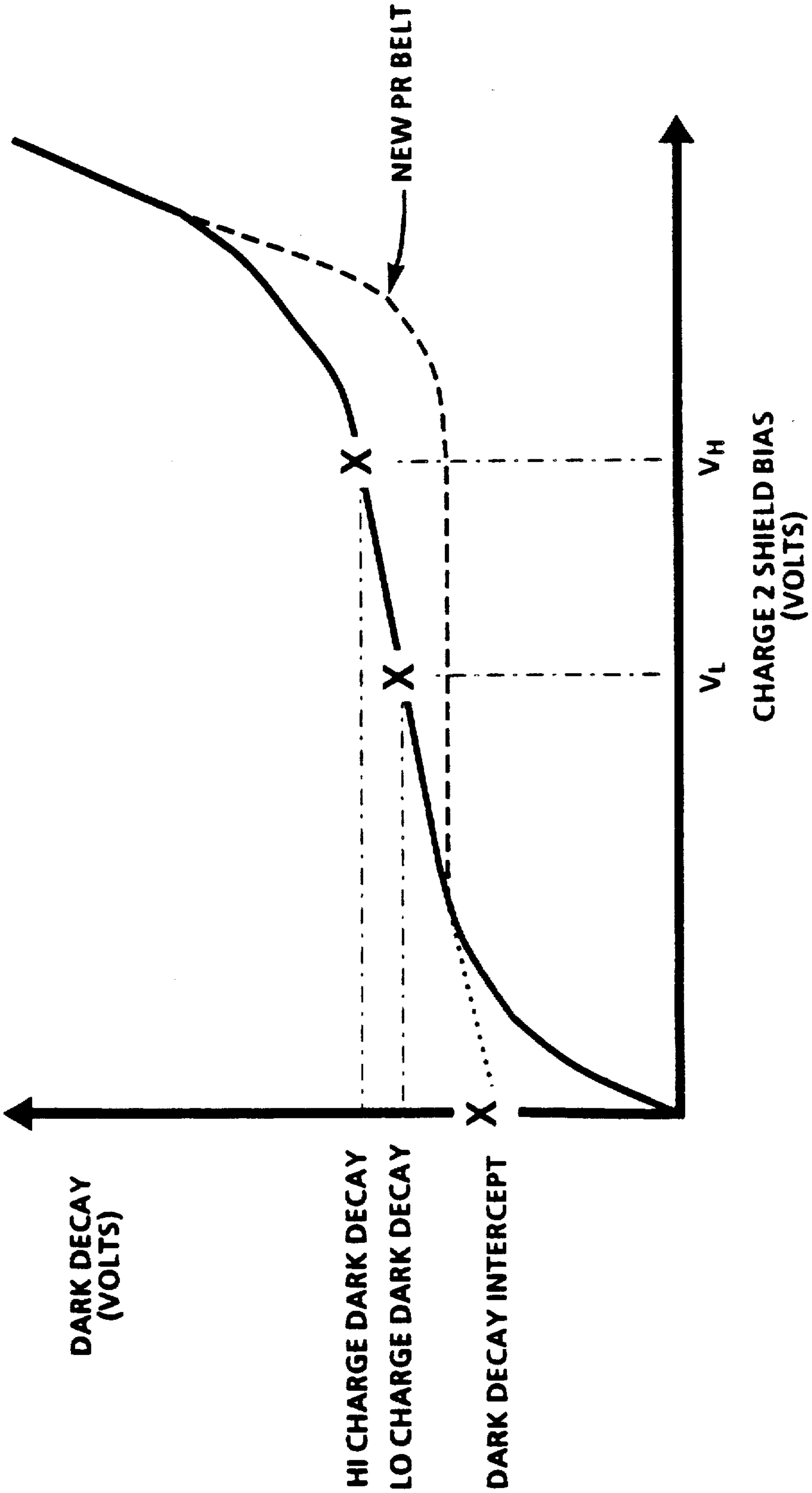
FIG. 10 is a graph depicting photoreceptor dark decay.
Figure 11A:
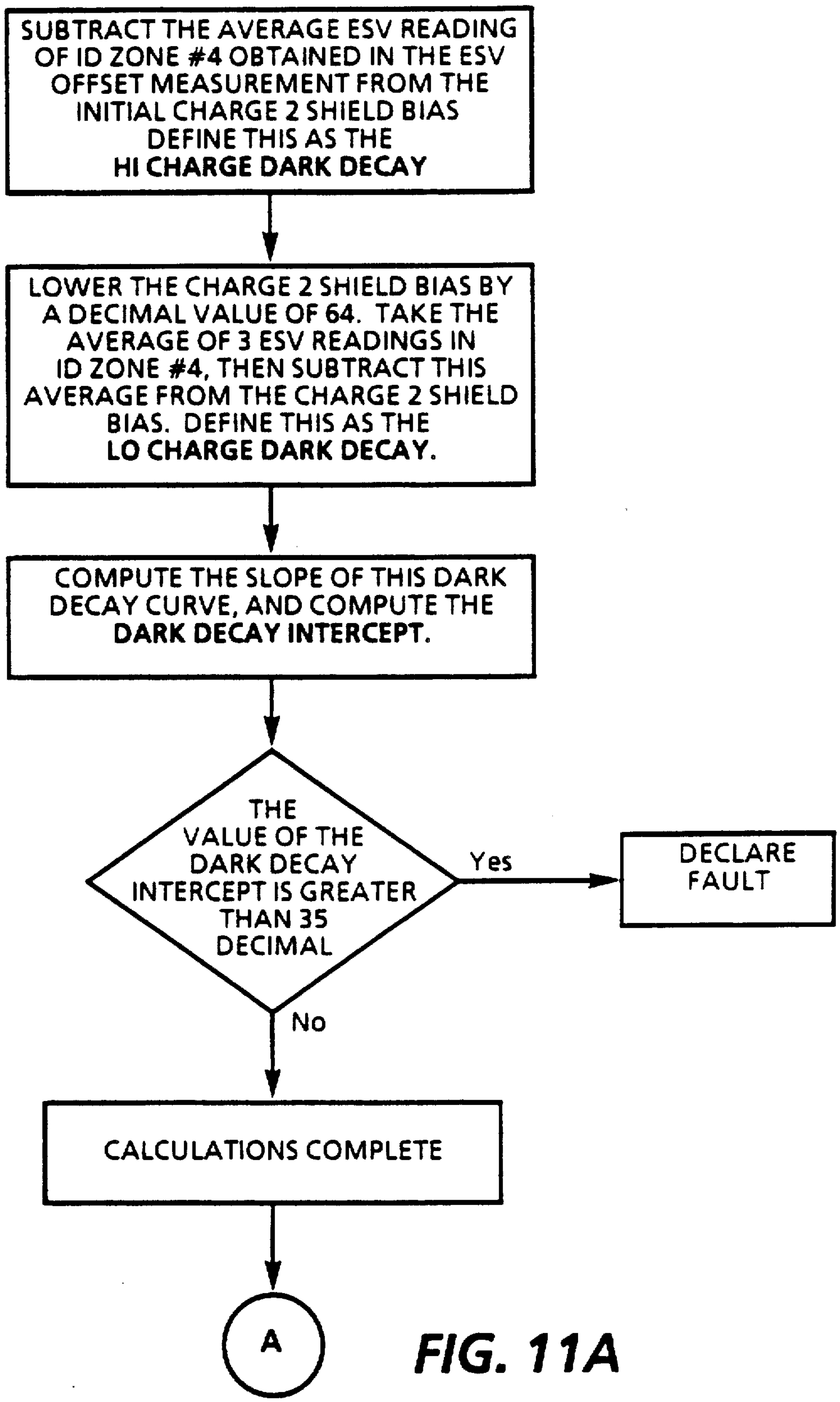
Figure 11B:
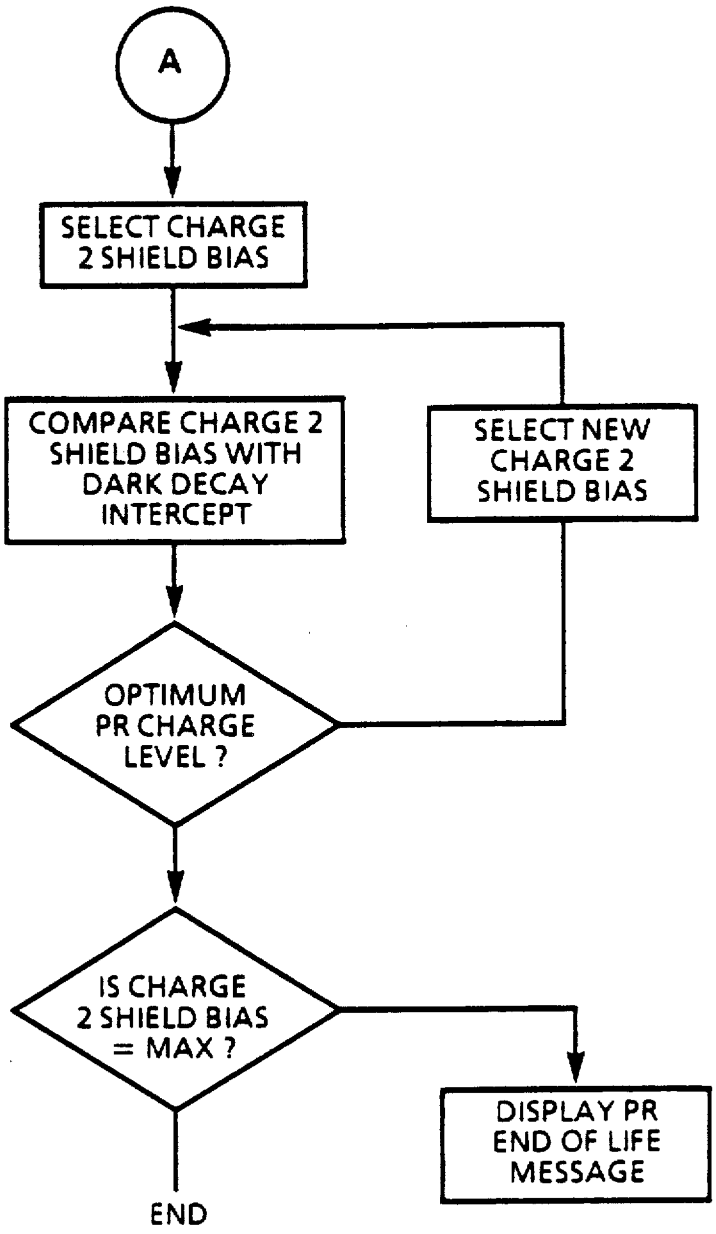
Figure 11C:
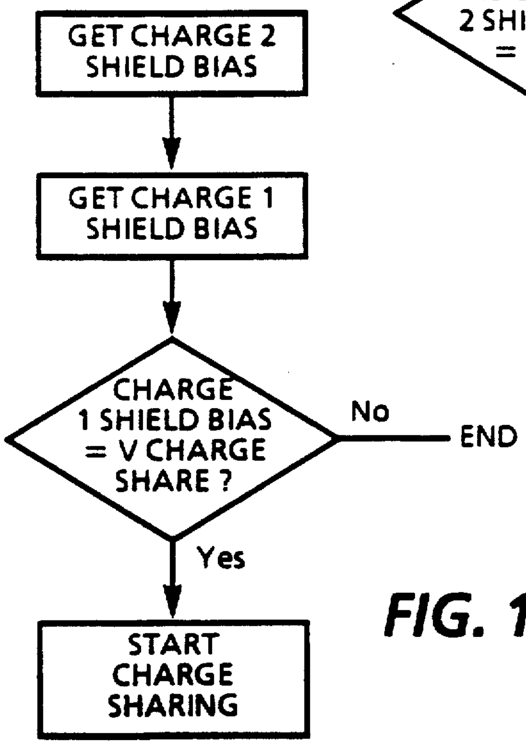

Referring to FIGS. 2 and 10 and 11, the control system measures the dark decay of photoreceptor 10 to set the bias voltage on shield 23 of dicorotron 24. In order to adjust the charge as accurately as possible, the control system measures the dark decay for two different values of shield bias, a high charge dark decay ($V_H$) and a low charge dark decay bias ($V_L$). The control system uses these two values to calculate a parameter called the dark decay intercept ($D_I$). Later, during normal operation, the control system uses intercept $D_I$ along with readings from ESV 100 to determine the bias for shield 23 of dicorotron 22 for each of the different machine copy modes.

As can be seen from FIG. 10, where belt 10 is new, photoreceptor dark decay is substantially constant regardless of the bias on shield 23 within the range of the shield bias that the control system typically operates. As belt 10 ages, dark decay starts to increase and the bias on shield 23 increases to compensate for the increasing dark decay. As belt 10 continues to age, the slope of the curve shown in FIG. 10 increases.

In order to set the bias on shield 23 of dicorotron 24 as quickly and as accurately as possible for the different machine copy modes, the control system must be able to anticipate or predict the amount of dark decay that will occur for a given shield bias. The control system uses the dark decay intercept $D_I$ to predict the amount of dark decay for a given shield biases.

When the value of the bias on shield 23 of dicorotron 24 reaches a predetermined maximum level, a message (PHOTORECEPTOR NEAR END OF LIFE) is displayed on screen 12 of UI 11.

Referring to FIG. 11*a*, the control system also monitors the relationship between the bias on shield 23 of dicorotron 22 and the bias on shield 23 of dicorotron 24. Based on this relationship, the control system calculates a value of shield bias for dicorotron 22 that if reached will initiate a charge sharing operation in which a part of the initial charge on photoreceptor 10 is provided by dicorotron 24. This ensures that the bias on shield 23 of dicorotron 22 is not operated at an extremely high level.

Pre-Flash

Referring particularly to FIG. 2, during normal operation, the charge on capacitors 35 of flash lamps 30 is raised to a minimum level prior to operation of preflash lamp 29. After preflash occurs with the document on platen 28, the charge on capacitors 35 is, where appropriate, raised to their final level and the main flash exposing the document occurs. The flash reference voltage that determines the minimum charge level of capacitors is calculated from certain operating parameters, i.e., the magnification setting, the exposure level, an Illumination Power Supply (IPS) calibration value from NVM 167, an age factor, and a preflash preset that corresponds to the minimum light required.

Figure 12A:
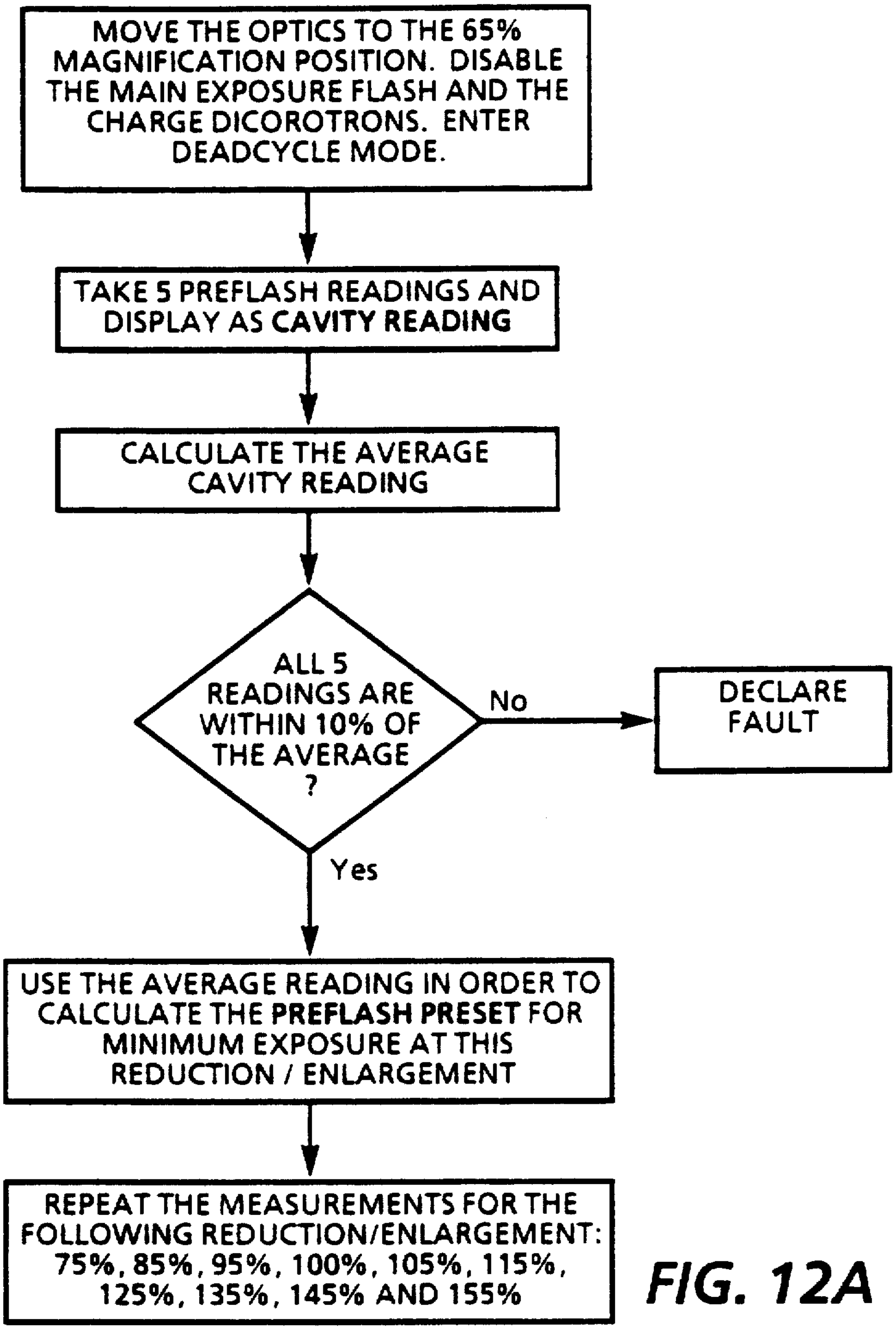
Figure 12B:
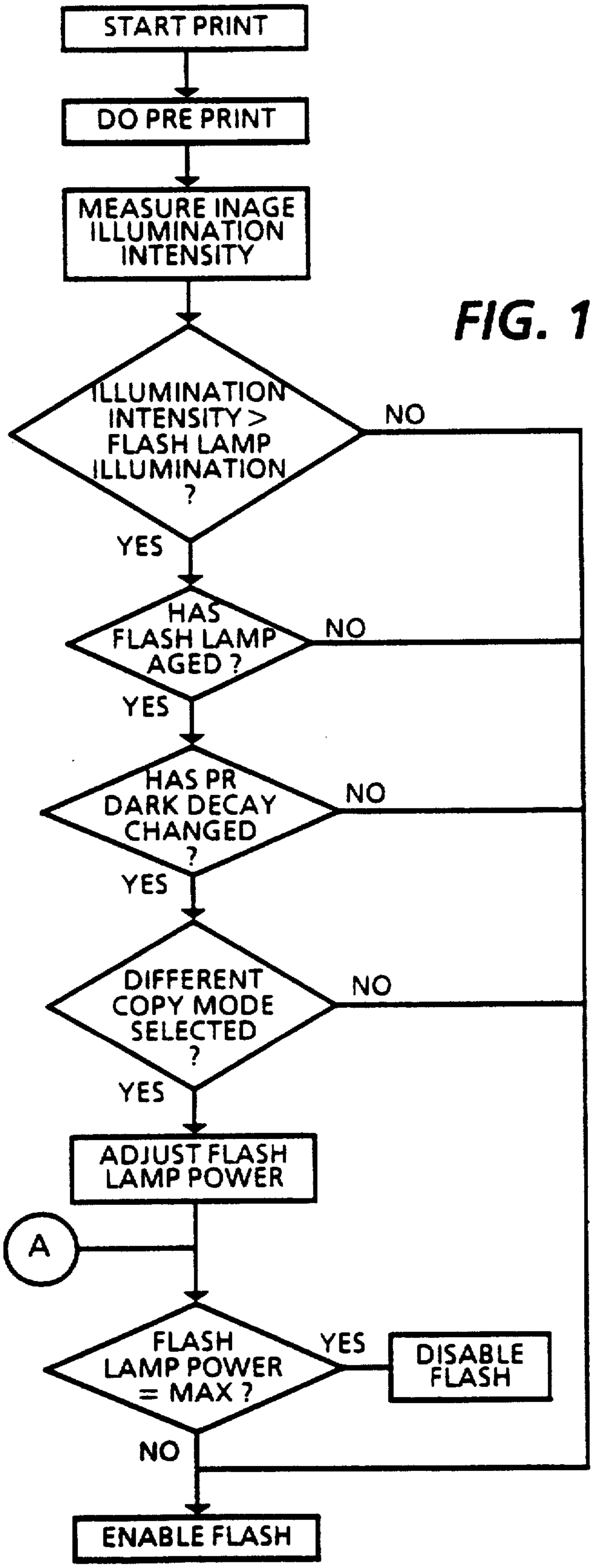
Figure 12C:
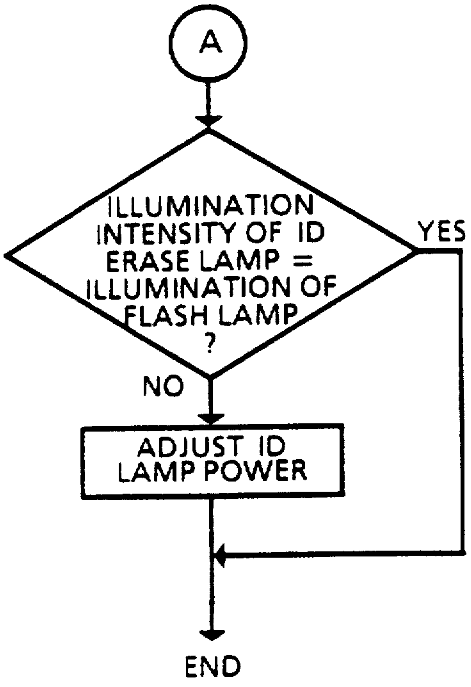

Referring also to FIG. 12, a preflash setup procedure is provided to obtain the preflash preset for various magnification levels. This procedure is used under certain operating circumstances, i.e., when the preflash PWB is replaced, sensor 31 is replaced, illumination power supply is replaced, etc. This setup procedure measures the preflash reflectance with white paper on platen 28 for various magnification positions of optics 32. The preflash presets that are obtained are thereafter used to determine the initial charge that is placed on flash capacitors 35.

Xerographic Setup

The xero setup is performed when certain xerographic components such as belt 10, developer 33, ESV 100, densitometer 113, patch generator 102, flash lamps 30, etc., are replaced. The xero procedure is also performed if the afore-described preflash setup is performed.

Referring also to FIG. 13, in this procedure, the high ($V_{HC}$) and low ($V_{LC}$) contrast voltages and the developer bias ($D_B$) for each of the machine copy modes are adjusted. Also, the intensity of ID lamp 108 is calibrated with the intensity of flash lamps 30, and the output intensity of a photocontrast lamp 112, the toner concentration, and the output intensity of patch generator 102 are adjusted.

For this setup, a special xerographic test pattern is placed on platen 28. As shown in FIG. 13, and referring also to FIG. 14, the pattern provides five images 150, 152, 154, 156, 158 of varying density for reading by ESV 100 following exposure on belt 10.

To calibrate the output intensity of ID lamp 108 to the output intensity of flash lamps 30, the control system compares the voltage reading from ESV 100 of patches 104 in the ID zones, representing the background voltage following exposure and discharge by ID lamp 108, to the voltage reading that corresponds to image 152 from a test pattern, representing the background voltage following exposure and discharge by flash lamps 30. Using this information, the control system varies the reference voltage of ID lamp 108 until the ESV readings are equal.

Referring to FIG. 15, for a normal background voltage $V_N$, the exposure intensity of ID lamp 108 can be changed without much if any change in the resulting voltage of belt 10. This is because belt 10 has been discharged as low as it is going to go. If adjustment was made at this background voltage, there could be a significant error in the setting of the ID lamp intensity. The purpose of the adjustment to ID lamp exposure intensity is to be sure that when the optics flash intensity is changed throughout the copy modes, the exposure intensity of ID lamp 108 is set to match the flash lamp intensity. For higher voltages on belt 10, i.e., $V_H$, the photoreceptor background voltage changes significantly with changes in exposure intensity. By temporarily adjusting the optics flash to give a background voltage of $V_H$, and calibrating the ID lamp 108 at this temporary background voltage adjustment of the exposure intensity of ID lamp 108 is performed more accurately.

Age factor is a variable in the determination of the voltage applied to the flash lamp capacitors 37. Age factor is an indication of the age of flash lamps 32 and the exposure characteristics of photoreceptor belt 10. Essentially, the age factor increases with the age of lamps 32. If the age factor is decreased, the light output from flash lamps 32 is decreased; if increased, the light output is increased.

After the intensity of ID lamp 108 is adjusted, the ESV offsets (FIG. 9) and the dark decay measurements (FIG. 11) of the initialization procedure are repeated. This is because light (referred to as ID stray light) from the front and rear segments of ID lamp 108 can affect the voltage of patch 104. Typically, the higher the intensity of lamp 108, the more the effect from ID stray light. If there is enough ID stray light, the ESV offset and Dark decay measurements may not be accurate and therefore these measurements are repeated.

The appearance of the output copy is determined primarily by the fuser function, transfer function, toner concentration, and electrostatics. Fuser function determines how well the image is fixed to the paper and the gloss level of the image while transfer function determines how much of the image is transferred from belt 10 to copy sheet 67. Toner concentration must be set to prevent image defects such as solid area deletions without excessive background while keeping toner consumption as low as possible. Essentially, fuser, transfer, and toner functions are fixed parameters and do not change with changes in machine operating modes.

Electrostatics relates to the levels of the image and background voltages on belt 10, and the developer bias. In order to change the appearance of the output copy, the charge, the exposure, and the developer bias are changed, depending upon the copy mode selected. The control system automatically sets the parameters for the electrostatics for each copy mode.

When a document 25 on platen 28 is exposed at a fixed level by flash lamps 30, the amount of light reflected off the document to discharge belt 10 depends on the density of the image. The magnitude of the voltage on belt 10 after exposure depends upon the initial charge, the exposure intensity, and the discharge characteristics of the individual belt. As seen in FIG. 16, the voltages on belt 10 are not linear with respect to the density of the image on platen 28.

Referring particularly to FIG. 13, for each of the various copy modes of which machine 5 is capable, specific contrast voltages and developer biases for the mode selected are required. A high contrast voltage $V_{HC}$ is equal to the ESV reading of the high density image 154 of the test pattern minus the ESV reading of the background image 152 while a low contrast voltage $V_{LC}$ is equal to the ESV reading of the low density image 156 minus the background image 152. Once the control system adjusts the initial charge on belt 10 and the flash lamp intensity to produce the contrast voltage specifications, the developer bias requirements are calculated based on the ESV reading of background image 152.

For adjusting purposes two values, referred to as copy lines (CL) and copy solids (CS) are used. CL is a number representing the optics flash exposure which primarily affects low contrast voltage $V_{LC}$. CS is a number representing the charge on belt 10 which primarily affects high contrast voltage $V_{HC}$. A third value, copy tones (CT), represents the intensity of the photocontrast lamp 112. The numbers used for these values depends upon the copy mode selected.

From FIGS. 17 and 18, it can be seen that the control system using these numbers must produce an exposure (EXP) setpoint and a dark dusting target (VDDP) setpoint that will produce the correct contrast voltages for each copy mode.

Standard Mode Setup

Referring to FIG. 19, one copy mode of machine 5, the standard mode, is used for most normal copy jobs. In setting up this mode, the control system adjusts the age factor and the shield bias of dicorotron 24 until the high contrast voltage $V_{HC\text{-}STD}$ and low contrast voltage $V_{LC\text{-}STD}$ are within a predetermined desired range for that mode. With the contrast voltages $V_{HC\text{-}STD}$ and $V_{LC\text{-}STD}$ set, the machine is cycled and ESV 100 measures the voltage on patches 104 to determine the dark dusting target (VDDP) setpoint.

For this mode, the copy line (CL) value is 5 while the copy solid value (CS) is 11. As shown in FIG. 18, these values represent a predetermined exposure setpoint $EXP_{STD}$ and a dark dusting target voltage ($VDDP_{STD}$) that is dependent on the photoreceptor. If machine 5 is run in this mode, an EXP setpoint of $EXP_{STD}$ and a Dark dusting target of $VDDP_{STD}$ would be obtained. This provides a high contrast ($V_{HC\text{-}STD}$) between images 154 and 152 (FIG. 10) on the image frame and a low contrast ($V_{LC\text{-}STD}$) between images 156 and 152. The value of the developer bias on developer rolls 34, 36 (FIG. 2) would be $V_{CL\text{-}STD(34,\ 36)}$ higher than the value of image 152 in the image frame and the value of the developer bias on developer roll 38 would be $V_{CL\text{-}STD(38)}$ higher than the value of image 152 in the image frame.

Halftone Mode Setup

Referring to FIG. 20, for another copy mode, i.e., the halftone mode, the control system adjusts the exposure setpoint and the shield bias of dicorotron 24 until the high contrast voltage $V_{HC\text{-}HT}$ and low contrast voltage $V_{LC\text{-}HT}$ are within a predetermined desired range for that mode. With the contrast voltages $V_{HC\text{-}HT}$ and $V_{LC\text{-}HT}$ set, the machine is cycled and ESV 100 measures the voltage on patches 104 to determine the dark dusting target (VDDP) setpoint. For this mode, the copy line (CL) value is 10 and the copy solid (CS) value is 6. As shown in FIG. 21, these values represent a predetermined exposure (EXP) setpoint of $EXP_{STD}$ and a dark dusting target voltage ($VDDP_{STD}$) that is dependent on the photoreceptor. If machine 5 is run in this mode, an EXP setpoint of $EXP_{STD}$ and a Dark dusting target of $VDDP_{STD}$ would be obtained. This provides a high contrast ($V_{HC\text{-}HT}$) between images 154 and 152 (FIG. 10) on the image frame and a low contrast ($V_{LC\text{-}HT}$) between images 156 and 152. The value of the developer bias on developer rolls 34, 36 (FIG. 2) would be $V_{CL\text{-}HT(34,\ 36)}$ higher than the value of image 152 in the image frame and the value of the developer bias on developer roll 38 would be $V_{CL\text{-}HT(38)}$ higher than the value of image 152 in the image frame.

The control system now has two points on both the copy lines and the copy solids graph (FIG. 21). To confirm that the correct setpoints are obtained, the control system uses the following formulas.

$$\text{EXP setpoint} = \text{EXP min} + \text{`EXPinc} \times (15 - E)\text{'} + F(M) - 128\text{'}$$

where

E is the value of the copy lines (CL) scale;

F(M) is the fine adjustment variable (not needed in the standard or halftone mode);

EXPmin is the minimum value of the exposure setpoint (15 on the copy lines scale); and EXPinc is the increment of how many numbers away from 15 is the present value.

The formula that determines the dark dusting target (VDDP) setpoint is:

$$\text{VP setpoint} = \text{VDDPmin} + \text{`VDDPinc} \times (-1\text{'}C(M) - 128\text{'}$$

where

D is the value on the copy solids (CS) scale;

C(M) is a fine adjustment variable (not needed in standard or halftone mode);

VDDPmin is the minimum value of the VDDP setpoint (a value of 1 on the copy solids scale); and VDDPinc is the increment of how may numbers away from 1 is the present value.

If the exposure (EXP) setpoint needed for the correct contrast is not the same as the initial calculated EXP setpoint, the control system adjusts the F(M) variable for that mode until the calculated EXP setpoint equals the setpoint needed for correct contrast. Likewise, if the VDDP setpoint needed for correct contrast is not the same as the initial calculated VDDP setpoint, the control system adjust the C(M) variable for that mode until the calculated VDDP setpoint equals the setpoint needed for correct contrast.

Remaining copy modes of machine 5 such as dark originals, light originals, etc. are similarly determined with the control system using selected copy line (CL) and copy solid (CS) values and formulas I and II to calculate the exposure (EXP) and the dark dusting target (VDDP) setpoints as well as developer biases. Then the control system measures and sets the contrasts as described. For photo mode, the additional step of adjusting the intensity of photocontrast lamp 112 is carried out.

Toner Concentration Setup

The percentage of toner in the developer is the toner concentration. The purpose of this setup procedure is to ensure that the toner concentration is high enough to prevent image defects such as solid area deletions, and yet low enough to prevent the development of background on the copies. It is also desirable to keep the toner concentration low so that the customer gets the maximum number of copies from the toner.

Referring to FIGS. 22–26, the two parameters that determine the reading of densitometer 113 of the developed patch 104 are the toner concentration and the development voltage of patch 104. The development voltage of patch 104 is equal to the patch voltage minus the developer bias voltage. In this setup procedure, the developer bias voltage is set to the standard mode level of $V_{CI\text{-}STD(34,\ 36)}$ above the background voltage. Patch generator 102 is switched off, and the charge by dicorotrons 22, 24 adjusted to create a known, fixed development voltage of $VDDP_{TC}$. The control system then controls toner dispenser motor 76 to add, then deplete the toner until the reading of the image developed on patch 104 by densitometer 113 is within a present specification at which the toner concentration is correct.

Flash lamps 30 are disabled during this setup so that there is created an image with a dark vertical band 160 down the center from exposure by ID lamp 108. The densitometer reading of the band 160 must always approach the target reading of T from a lower (i.e. overtoned) value. Toner dispenser motor 67 is off at this time to ensure that the toner in developer housing 33 is mixed completely.

Referring to FIGS. 23 and 24, if the initial reading by densitometer (DSS) 113 is below T + 2, ID lamp 108 produces the copies with a large (i.e., wide) dark vertical band 162. Toner dispenser motor 67 is switched off until the toner concentration decreases to produce a densitometer reading greater than T + 5. At this point, densitometer (DSS) 113 is re-calibrated to ensure that if the machine was overtoned, densitometer 113 is now calibrated to a clean photoreceptor belt 10. ID lamp 108 now produces the copies with small band 160 and motor 67 is switched on to increase the toner concentration. When the densitometer (DSS) reading is below T (see FIG. 23), motor 67 is switched to a duty cycle that while still increasing the toner concentration, adds toner more slowly. This continues until the densitometer (DSS) reading is below T − 3. Motor 67 is then switched off and the copies with band 160 slowly decrease toner concentration until the densitometer reading is within specification of T.

Referring to FIGS. 27 and 28, in order to control the toner concentration, the output intensity of patch generator 102 must be calibrated so that patch 104 is always developed at $VDDP_{TC}$. As change is made from one copy mode to another, the value of the dark dusting voltage and the developer bias voltage changes. If patch 104 is always developed at $VDDP_{TC}$, regardless of the charge or the developer bias, any changes in the reading of DSS 113 must be due to a change in toner concentration. The control logic then controls toner dispenser motor 76 as required.

During this setup, the developer bias stays constant at $V_{CL\text{-}STD(34,\ 36)}$ above the background voltage. Then, for two values of the charge, the control logic adjusts the input voltage to patch generator 102 until the output intensity produces a patch development voltage of $VDDP_{TC}$. The two values of the charge are a high charge (i.e., a standard mode value of 11 on the copy solids scale) and a low charge (i.e., a value of 3 on the copy solids scale).

ESV 100 is not used to measure the patch voltage during this setup. Instead the control logic uses DSS 113 to determine when the patch development voltage is $VDDT_{TC}$. With the charge at a given value, if the input voltage to patch generator 102 is adjusted until the reading by DSS 113 of the developed patch 104 again reads T, then the patch development voltage must be $VDDP_{TC}$ because the toner concentration remains constant. The average DSS value is the average of the individual patch reads.

When the input voltage is established for two measurement points, the control logic can calculate the required input voltage for any value of the charge or the developer bias.

While the invention has been described with reference to the structure disclosed, it is not confined to the details set forth, but is intended to cover such modifications or changes as may come within the scope of the following claims.

I claim:

1. A process for assuring that the intensity at which images are exposed to the photoreceptor in a reproduction machine is sufficient, said machine having at least one main flash lamp for image exposure, chargeable capacitor means for driving said main flash lamp to provide a predetermined image exposure intensity, a power source for charging said capacitor means to a level sufficient to provide said predetermined image exposure intensity, and a relatively small preflash lamp for calibrating image intensities, comprising the steps of:
   - (a) actuating said preflash lamp to expose each image prior to exposure of said image by said main flash lamp;
   - (b) determining the exposure intensity required to expose said image from the light reflected from said image on exposure by said preflash lamp;
   - (c) where the exposure intensity for said image is greater than the predetermined image exposure intensity provided by said main flash lamp, increasing power to said capacitor means by an amount sufficient to raise the exposure intensity of said main flash lamp to a level greater than said predetermined image exposure intensity whereby to provide the increased exposure intensity required for said image.

2. The process according to claim 1 including the steps of:
   - (a) monitoring changes in the dark decay level of said photoreceptor; and (b) said control means adjusting power to said capacitor means to offset changes in the dark decay level of said photoreceptor whereby to maintain said predetermined image exposure intensity.

3. The process according to claim 2 including the step of:

where the power input to said capacitor means reaches a preset maximum, disabling said main flash lamp.

4. The process according to claim 1 including the step of:

adjusting power to said main flash lamp in response to the copy mode selected.

5. In a reproduction machine having a photoreceptor on which images to be produced are created, at least one main flash for image exposure, chargeable capacitor means for driving said main flash lamp to provide a predetermined image exposure intensity, a power source for charging said capacitor means to a level sufficient to provide said predetermined image exposure intensity, the combination of:

(a) a relatively small preflash lamp for exposing said images;

(b) control means for actuating said preflash lamp before said main flash lamp;

(c) sensing means for sensing the illumination intensity required to expose said image from exposure of said image by said preflash lamp;

(d) said control means being responsive to said sensing means for increasing power to said capacitor means when the illumination intensity required to expose said image is greater than said main flash lamp predetermined image exposure intensity, said control means increasing power to said capacitor means by an amount necessary to raise the image exposure intensity of said main flash lamp to the illumination intensity required to expose said image.

6. The machine according to claim 5 including:

(a) means to monitor changes in the dark decay level of said photoreceptor;

(b) said control means adjusting power to said capacitor means to offset changes in the dark decay level of said photoreceptor whereby to maintain said predetermined image exposure intensity.

7. The machine according to claim 6 in which said control means disables said main flash lamp in response to the power input to said capacitor means reaching a preset maximum.

* * * * *